United States Patent
Becker et al.

(10) Patent No.: US 12,297,347 B2
(45) Date of Patent: May 13, 2025

(54) SYNTHESIS AND CHARACTERIZATION OF WELL DEFINED POLY(PROPYLENE FUMARATE) AND POLY (ETHYLENE GLYCOL) BLOCK COPOLYMERS

(71) Applicants: Matthew Becker, Chapel Hill, NC (US); James A Wilson, Wolverhampton (GB); Rodger A. Dilla, Akron, OH (US)

(72) Inventors: Matthew Becker, Chapel Hill, NC (US); James A Wilson, Wolverhampton (GB); Rodger A. Dilla, Akron, OH (US)

(73) Assignee: The University of Akron, Akron, OH (US)

( * ) Notice: Subject to any disclaimer, the term of this patent is extended or adjusted under 35 U.S.C. 154(b) by 267 days.

(21) Appl. No.: 16/637,358

(22) PCT Filed: Aug. 7, 2018

(86) PCT No.: PCT/US2018/045520
§ 371 (c)(1),
(2) Date: Feb. 7, 2020

(87) PCT Pub. No.: WO2019/032524
PCT Pub. Date: Feb. 14, 2019

(65) Prior Publication Data
US 2021/0371645 A1    Dec. 2, 2021

Related U.S. Application Data

(60) Provisional application No. 62/541,889, filed on Aug. 7, 2017.

(51) Int. Cl.
C08L 67/02    (2006.01)
C08G 63/676    (2006.01)
(Continued)

(52) U.S. Cl.
CPC .......... C08L 67/025 (2013.01); C08G 63/676 (2013.01); C08G 65/10 (2013.01); C08J 3/075 (2013.01); C08L 67/06 (2013.01)

(58) Field of Classification Search
CPC ...... C08G 63/676; C08G 63/42; C08G 63/81; C08G 63/826; C08G 65/10; C08J 3/075; C08J 2353/00; C08L 67/06
See application file for complete search history.

(56) References Cited

U.S. PATENT DOCUMENTS 5,527,864 A    6/1996    Suggs
6,306,821 B1    10/2001    Mikos et al.
(Continued)

FOREIGN PATENT DOCUMENTS

CN    105982845 A  *  10/2016  ............. A61K 38/26
JP    2002542339 A    12/2002
WO    0062630 A1    10/2000

OTHER PUBLICATIONS

Suggs, L.J. et al.; Macromolecules, 1997, vol. 30, p. 4318-4323.*
(Continued)

*Primary Examiner* — Satya B Sastri
(74) *Attorney, Agent, or Firm* — Renner, Kenner, Greive, Bobak, Taylor & Weber

(57) ABSTRACT

In one or more embodiments, the present invention provides a low molecular weight, non-toxic, resorbable poly(ethylene glycol) (PEG)-block-poly(propylene fumarate) (PPF) diblock copolymers and poly(propylene fumarate) (PPF)-block-poly(ethylene glycol) (PEG)-block-poly(propylene fumarate) (PPF) triblock copolymers (and related methods for their making and use) that permits hydration for the formation of such things as hydrogels and has constrained and predictable material properties suitable for 3D printing and drug delivery applications. Using continuous digital light processing (cDLP) hydrogels the diblock and triblock (Continued)

copolymers can be photochemically printed from an aqueous solution into structures having a 10-fold increase in elongation at break compared to traditional diethyl fumarate (DEF) based printing. Furthermore, PPF-PEG-PPF triblock hydrogels have also been found in vitro to be biocompatible across a number of engineered MC3T3, NIH3T3, and primary Schwann cells.

17 Claims, 24 Drawing Sheets

(51) Int. Cl.
  *C08G 65/10* (2006.01)
  *C08J 3/075* (2006.01)
  *C08L 67/06* (2006.01)

(56) References Cited

U.S. PATENT DOCUMENTS

| | | |
|---|---|---|
| 2003/0152548 A1 | 8/2003 | Mikos et al. |
| 2006/0018949 A1 | 1/2006 | Ammon, Jr. et al. |
| 2008/0262102 A1 | 10/2008 | Wang et al. |
| 2010/0303878 A1* | 12/2010 | Slager ............... A61L 31/10 424/130.1 |
| 2011/0212501 A1 | 9/2011 | Yoo |
| 2017/0355815 A1 | 12/2017 | Becker et al. |

OTHER PUBLICATIONS

Suggs, Laura J., et al.,"Synthesis and Characterization of a Block Copolymer Consisting of Poly(propylene fumarate) and Poly(ethylene glycol)" Macromolecules 1997, 30, 4318-4323.

Drury, et al. : Hydrogels for tissue engineering: scaffold design variables and applications, Biomaterials 24 (2003) 4337-4351.

Japanese Office Action dated Jan. 20, 2023 and an English language translation.

Esfandiar Behravesh et.al., Synthesis and Characterization of Triblock Copolymers of Methoxy Poly (ethylene glycol) and Poly (propylene fumarate), Biomacromolecules, US, 2002, 3, 153-158.

Laura J. Suggs et.al., "In vitro cytotoxicity and in vivo biocompatibility of poly (propylene fumarate-co-ethylene glycol) hydrogels," Journal of Biomedical Material Research, 1999, 46, 22-32.

* cited by examiner

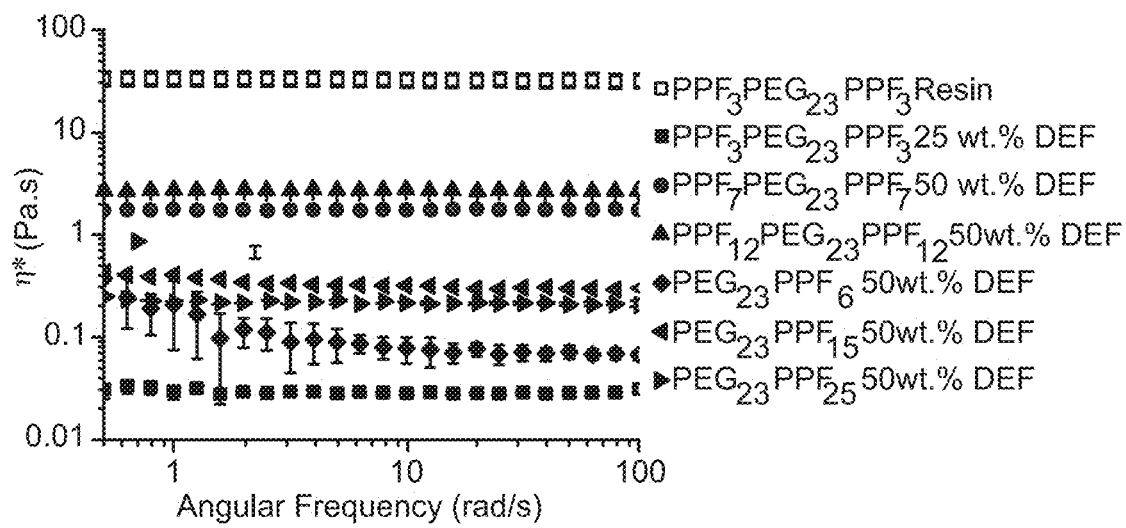
FIG. 6
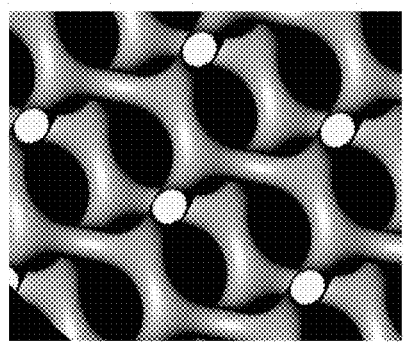
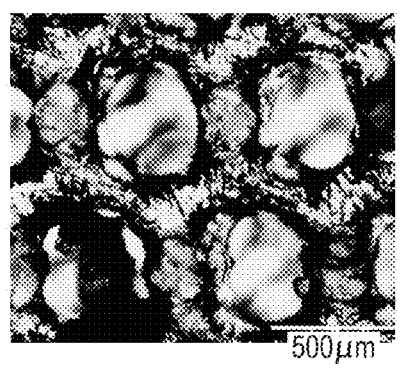
FIG. 7A      FIG. 7B

SYNTHESIS AND CHARACTERIZATION OF WELL DEFINED POLY(PROPYLENE FUMARATE) AND POLY (ETHYLENE GLYCOL) BLOCK COPOLYMERS

CROSS REFERENCE TO RELATED APPLICATIONS

This application claims the benefit of International application serial number PCT/US18/45520, entitled "Synthesis and Characterization of Well Defined Poly (Propylene Fumarate) and Poly (Ethylene Glycol) Block Copolymers," filed Aug. 7, 2017, which claims the benefit of U.S. provisional patent application Ser. No. 62/541,889 entitled "Synthesis and Characterization of Well Defined Poly (Propylene Fumarate) and Poly (Ethylene Glycol) Block Copolymers," filed Aug. 7, 2017, and are incorporated herein by reference in their entirety.

STATEMENT REGARDING FEDERALLY SPONSORED RESEARCH OR DEVELOPMENT SUPPORT

This invention was made with government support under contract number P41EB001046 awarded by National Institutes of Health. The government has certain rights in the invention.

NAMES OF THE PARTIES TO A JOINT RESEARCH AGREEMENT

The present application stems from work done pursuant to a Joint Research Agreement between The University of Akron of Akron, Ohio and 3D BioActives LLC of Pepper Pike, Ohio.

FIELD OF THE INVENTION

One or more embodiments, the present invention relates to block copolymers of poly(ethylene glycol)(PEG) and poly(propylene fumarate) (PPF). In certain embodiments, the present invention relates to poly(propylene fumarate) PPF/poly(ethylene glycol) (PEG) diblock copolymers and poly(propylene fumarate) (PPF)-block-poly(ethylene glycol) (PEG)-block-poly(propylene fumarate) (PPF) triblock copolymers for use in various, hydrogel, drug delivery and regenerative medicine applications.

BACKGROUND OF THE INVENTION

Materials for tissue engineering applications must meet several criteria to become clinically relevant. In addition to cell viability, a union of suitable mechanical properties with sufficient processing flexibility to produce morphologically complex scaffolds is desirable. It has been well demonstrated that both mechanical properties as well as scaffold topology can greatly influence cell behavior and differentiation; therefore, a functional material should concomitantly possess mechanical properties similar to the target tissue while providing a processing handle to produce complex, high resolution structures.

Hydrogels are networks of hydrophilic polymers that can easily be tailored to match these design parameters as a consequence of their tunable mechanical properties and intrinsic network morphology. For example, it is known that the modulus of poly(ethylene glycol) (PEG) oxime hydrogels can be tuned using a kinetically-controlled crosslinking reaction independent of chemistry, concentration, and stoichiometry. The moduli of other hydrogel systems can be adjusted by changing the weight percent of the hydrogel. Furthermore, facile functionalization of hydrogels has afforded investigations into the role of exogenous biomarkers on cell behavior. However, the vast majority of hydrogel systems are limited to molding fabrication techniques, greatly limiting the variety as well as resolution control of scaffold architectures that can be produced.

Recently, additive manufacturing has provided avenues to the production of morphologically complex structures that have been unachievable by other processing methods. This technique provides crucial advantages in the development of tissue engineering scaffolds as features such as porosity and increased surface area are known to promote host body infiltration of a synthetic implant. Some techniques of additive manufacturing such as fused deposition modeling (FDM) have been applied to hydrogel systems such as hyaluronic acid and sodium alginate-based gels. Furthermore, a recent report demonstrated the use of continuous digital light processing (cDLP) techniques to print PEG-diacrylate (PEG-DA) hydrogels into high resolution structures. However, hydrogel materials available for both techniques are limited, as both the number and location of the crosslinking were limited.

cDLP additive manufacturing uses the stepwise production of UV cured layers to build a structure from a photoreactive liquid resin. This technique can produce extremely fine (e.g. <120 µm) features and through the use of computer aided modeling (CAM) can be tailored to create scaffolds for patient-specific defects. However, the viscosity of the polymer resin must be sufficiently low that it can flow readily (i.e. $\eta^* < 1\text{-}3$ Pa·s.), requiring the use of a diluent for many polymers.

One such polymer that has shown great utility for cDLP is poly(propylene fumarate)(PPF). Poly(propylene fumarate) (PPF) is a linear unsaturated polyester based upon fumaric acid, which is a small molecule that can be removed via the Krebs cycle. It is non-toxic, biodegradable, has tunable mechanical properties and can be 3-D printed into a wide range of configurations, making it highly useful for many biomedical and drug delivery applications. First reported by Mikos and coworkers and developed specifically for bone tissue regeneration, this UV-crosslinkable polymer provides robust mechanical strength while also degrading into a Krebs-cycle constituent (fumaric acid) and a ubiquitous food additive (propylene glycol).

While the first described syntheses utilized step-growth polymerizations, Coates el al. demonstrated the ring-opening co-polymerization (ROCOP) of propylene oxide (PO) and maleic anhydride (MA) in the presence of a cobalt catalyst to produce well-controlled PPM that could be converted to PPF upon isomerization. (See, Diciccio, A. M.; Coates, G. W. Ring-Opening Copolymerization of Maleic Anhydride with Epoxides. *J. Am. Chem. Soc.* 2011, 133, 10724-10727, the disclosures of which are incorporated herein by reference in their entirety.) Producing narrow molecular mass distribution polymers is paramount in tissue engineering applications as chain distribution can affect degradation, mechanical properties, and the fidelity of scaffold composition. Magnesium ethoxide has since been utilized as a ROCOP catalyst to produce PPF albeit with less control but avoiding the toxicity of cobalt. With the use of diethyl fumarate (DEF) as a viscosity modifier and reactive diluent, PPF was formed into cell viable scaffolds using cDLP. (See, Luo, Y.; Dolder, C. K.; Walker, J. M.; Mishra, R.; Dean, D.; Becker, M. L. Synthesis and Biological Evaluation of Well-Defined Poly(Propylene Fumarate) Oligomers and Their Use in 3D Printed Scaffolds. *Biomacromolecules* 2016, 17 (2), 690-697, the disclosures of which are incorporated herein by reference in their entirety.)

More recently, the well-controlled ROCOP of PPF has been demonstrated using Mg(BHT)$_2$(THF)$_2$ as a catalyst, resulting in molecular mass distributions (Đ$_m$) similar to those reported by Coates et al., but without the toxic cobalt. (See, Wilson, J. A.; Luong, D.; Kleinfehn, A. P.; Sallam, S.; Wesdemiotis, C.; Becker, M. L. Magnesium Catalyzed Polymerization of End Functionalized Poly(Propylene Maleate) and Poly(Propylene Fumarate) for 3D Printing of Bioactive Scaffolds. *J. Am. Chem. Soc.* 2018, 140, 277-284, the disclosures of which are incorporated herein by reference in their entirety.) Furthermore, chain end-functionalization was achieved in this system using a functional alcohol initiator, simultaneously introducing a reactive handle for post polymerization and post-printing functionalization. Unfortunately, however, because it is a hydrophobic glassy solid, PPF has not been used in applications that require hydration, such as hydrogels.

To avoid this limitation, attempts have been made to polymerize PPF from the end of a PEG-diol chain to produce robust, 3D-printable hydrogels. Multiblock poly(propylene fumarate-co-ethylene glycol) polymers with broad molecular mass distribution have been reported that employ a step-growth transesterification mechanism to incorporate ethylene glycol subunits into PPF. However, well-ordered block copolymers of PEG and PPF suitable for 3D printing have not discovered or developed.

Accordingly, what is needed in the art are well-ordered block copolymers of PEG and PPF suitable 3D-printing, that have suitable swelling, degradation, and tensile mechanical properties for use as a hydrogel in tissue engineering, drug delivery, and other biomedical applications.

SUMMARY OF THE INVENTION

In one or more embodiments, the present invention provides a low molecular weight, non-toxic, resorbable poly (ethylene glycol) (PEG)-block-poly(propylene fumarate) (PPF) diblock copolymers (PEG$_n$PPF$_m$ polymers) and poly (propylene fumarate) (PPF)-block-poly(ethylene glycol) (PEG)-block-poly(propylene fumarate) (PPF)triblock copolymers (PPF$_m$PEG$_n$PPF$_m$ polymers) (and related methods for their making and use) that permit hydration for the formation of such things as hydrogels and has constrained and predictable material properties suitable for 3D printing and drug delivery applications. Using continuous digital light processing (cDLP) hydrogels the diblock and triblock copolymers can be photochemically printed from an aqueous solution into structures having a 10-fold increase in elongation at break compared to traditional diethyl fumarate (DEF) based printing. Furthermore, PPF-PEG-PPF triblock hydrogels have also found to be biocompatible in vitro across a number of engineered MC3T3, NIH3T3, and primary Schwann cells.

In a first aspect, the present invention is directed to a block copolymer of poly(ethylene glycol) (PEG) and poly(propylene fumarate) (PPF) comprising from about 5% to about 95% PEG by weight. In some of these embodiments, the block copolymer will have a number average molecular weight (M$_n$) of from about 500 Da to about 100,000 Da. In one or more embodiments, the block copolymers of the present invention includes any one or more of the above referenced embodiments of the first aspect of the present invention wherein the block co polymer of PEG and PPF is a PEG/PPF di-block copolymer.

In one or more embodiments, the block copolymers of the present invention includes any one or more of the above referenced embodiments of the first aspect of the present invention wherein the block co polymer of PEG and PPF is a PEG/PPF di-block copolymer having the formula:

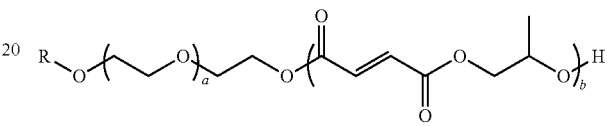

where a is an integer from about 4 to about 100; and b is an integer from about 2 to about 100; and R is a functional group selected from the group consisting of methyl groups, benzyl groups, alkyne groups, propargyl groups, allyl groups, alkene groups, 4-dibenzyocyclooctyne groups, cyclooctyne groups, ketone groups, aldehyde groups, tertiary halogen groups, poly(ethylene glycol) groups, and combinations thereof.

In one or more embodiments, the block copolymers of the present invention includes any one or more of the above referenced embodiments of the first aspect of the present invention wherein the block co polymer of PEG and PPF is a PEG/PPF di-block copolymer having the formula:

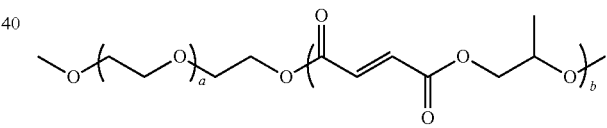

where a is an integer from about 4 to about 100 and b is an integer from about 2 to about 100.

In one or more embodiments, the block copolymers of the present invention includes any one or more of the above referenced embodiments of the first aspect of the present invention wherein the block co polymer of PEG and PPF is a PPF/PEG/PPF tri-block copolymer. In one or more embodiments, the block copolymers of the present invention includes any one or more of the above referenced embodiments of the first aspect of the present invention wherein the block co polymer of PEG and PPF is a PPF/PEG/PPF tri-block copolymer having the formula:

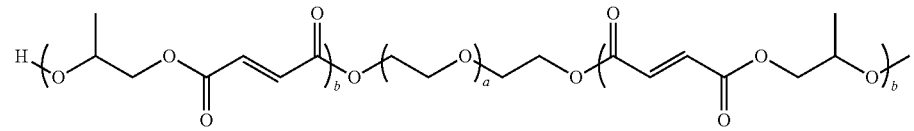

where a is an integer from about 2 to about 100 and each b is an integer from about 2 to about 100.

In a second aspect, the present invention is directed to a method for making the block co polymer the first aspect of the present invention comprising: dissolving a propylene oxide, maleic anhydride, a PEG initiator, and a magnesium catalyst in a suitable solvent; heating the solution to a temperature of from about 40° C. to about 80° C. for from about 1 hours to about 24 hours to produce a poly(ethylene glycol-b-propylene maleate) or poly(propylene maleate-b-ethylene glycol-b-propylene maleate) intermediate; dissolving the poly(ethylene glycol-b-propylene maleate) or poly(propylene maleate-b-ethylene glycol-b-propylene maleate) intermediate in a suitable solvent and adding diethylamine; and heating the solution to reflux for from about 1 to about 24 hours to produce the block co polymer of the first aspect of the present invention.

In one or more embodiments, the method of the present invention includes any one or more of the above referenced embodiments of the second aspect of the present invention wherein the PEG initiator has a number average molecular weight ($M_n$) of from about 100 Da to about 10,000 Da. In one or more embodiments, the method of the present invention includes any one or more of the above referenced embodiments of the second aspect of the present invention wherein the PEG initiator has from about 2 to about 50 ethylene glycol units. In one or more embodiments, the method of the present invention includes any one or more of the above referenced embodiments of the second aspect of the present invention wherein the PEG initiator is mono-functional. In one or more embodiments, the method of the present invention includes any one or more of the above referenced embodiments of the second aspect of the present invention wherein the PEG initiator is methyl ether PEG having a number average molecular weight ($M_n$) of from about 100 to about 10,000.

In one or more embodiments, the method of the present invention includes any one or more of the above referenced embodiments of the second aspect of the present invention wherein the PEG initiator is di-functional. In one or more embodiments, the method of the present invention includes any one or more of the above referenced embodiments of the second aspect of the present invention wherein the PEG initiator is a PEG diol having a number average molecular weight ($M_n$) of from about 100 Da to about 10,000 Da.

In one or more embodiments, the method of the present invention includes any one or more of the above referenced embodiments of the second aspect of the present invention wherein the magnesium catalyst is $Mg(BHT)_2(THF)_2$. In one or more embodiments, the method of the present invention includes any one or more of the above referenced embodiments of the second aspect of the present invention wherein the suitable solvent is selected from the group consisting of toluene, hexane, heptane, octane, and combinations thereof. In one or more embodiments, the method of the present invention includes any one or more of the above referenced embodiments of the second aspect of the present invention wherein the suitable solvent is toluene.

In one or more embodiments, the method of the present invention includes any one or more of the above referenced embodiments of the second aspect of the present invention wherein the suitable solvent is selected from the group consisting of chloroform, dichloromethane, and combinations thereof. In one or more embodiments, the method of the present invention includes any one or more of the above referenced embodiments of the second aspect of the present invention wherein the suitable solvent is chloroform. In one or more embodiments, the method of the present invention includes any one or more of the above referenced embodiments of the second aspect of the present invention wherein the degree of polymerization is from about 2 to about 100.

In another aspect, the present invention is directed to a micelle comprising the block copolymer of the first aspect of the present invention.

In another aspect, the present invention is directed to a 3-D printed polymeric structure comprising the block copolymer of the first aspect of the present invention.

In another aspect, the present invention is directed to a hydrogel comprising the block copolymer of the first aspect of the present invention.

BRIEF DESCRIPTION OF THE DRAWINGS

For a more complete understanding of the features and advantages of the present invention, reference is now made to the detailed description of the invention along with the accompanying figures in which:

FIG. 6 is a graph showing the results of viscometry experiments for $PPF_mPEG_nPPF_m$ with 0 wt. %, 25 wt. % and 50 wt. % DEF. The DEF was used as a viscosity modifier for the extremely viscous homopolymer resin, 50 wt. % being found optimal for 3D printing. FIG. 6 also shows results for $PEG_nPPF_m$ diblock copolymer with different PPF blocks with 50% DEF to benchmark the viscosity against other resin formulations.

FIG. 7 show a CAD model of a gyroidal scaffold (FIG. 7A) and an image taken of a gyroidal scaffold successfully printed from a 50 wt. % solution of $PPF_3PEG_{23}PPF_3$ in DEF (FIG. 7B).

DETAILED DESCRIPTION OF THE ILLUSTRATIVE EMBODIMENTS

Figure 1A:
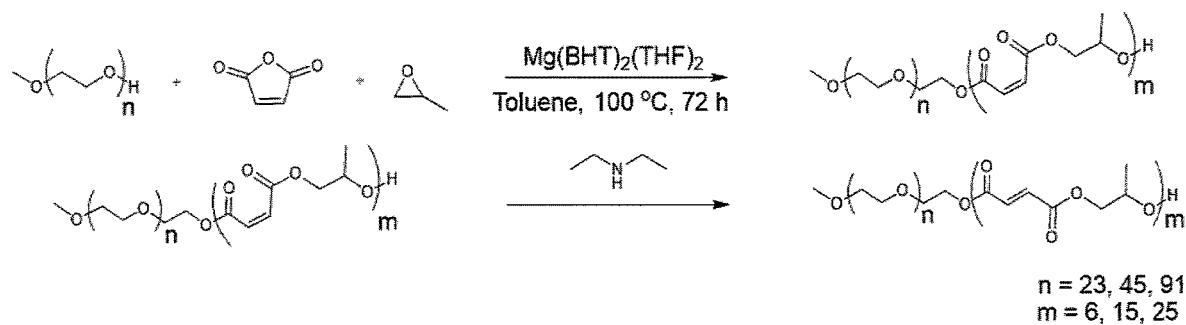
FIGS. 1A-B are the reaction mechanisms for synthesis of PEGPPF diblock copolymers according to the present invention initiated by methyl ether PEG to produce poly(ethylene glycol-b-propylene maleate) (FIG. 1A) and a PEG-diol to produce poly(propylene maleate-b-ethylene glycol-b-propylene maleate) (FIG. 1A).

In one or more embodiments, the present invention provides a low molecular weight, non-toxic, resorbable poly (ethylene glycol) (PEG)-block-poly(propylene fumarate) (PPF) diblock copolymers and poly(propylene fumarate) (PPF)-block-poly(ethylene glycol) (PEG)-block-poly(propylene fumarate) (PPF) triblock copolymers (and related methods for their making and use) that permits hydration for the formation of such things as hydrogels and has constrained and predictable material properties suitable for 3D printing and drug delivery applications. Using continuous digital light processing (cDLP) hydrogels the diblock and triblock copolymers can be photochemically printed from an aqueous solution into structures having a 10-fold increase in elongation at break compared to traditional diethyl fumarate (DEF) based printing. Furthermore, PPF-PEG-PPF triblock hydrogels have also been found to be biocompatible in vitro across a number of engineered MC3T3, NIH3T3, and primary Schwann cells.

In a first aspect, the present invention is directed to block copolymers of poly(ethylene glycol) (PEG) and poly(propylene fumarate) (PPF). In one or more embodiments, the PEG/PPF block co polymer of the present invention will have a number average molecular weight ($M_n$) of from about 500 Da to about 100,000 Da. In some embodiments, the PEG/PPF block co polymer of the present invention will have a number average molecular weight ($M_n$) of 5,000 Da or more, in other embodiments, 10,000 Da or more, in other embodiments, 20,000 Da or more, in other embodiments, 30,000 Da or more, in other embodiments, 40,000 Da or more, and in other embodiments, 50,000 Da or more. In some embodiments, the PEG/PPF block co polymer of the present invention will have a number average molecular weight ($M_n$) of 90,000 Da or less, in other embodiments, 80,000 Da or less, in other embodiments, 70,000 Da or less, in other embodiments, 60,000 Da or less, in other embodiments, 50,000 or Da less, in other embodiments, 40,000 Da or less.

In one or more embodiments, the PEG/PPF block co polymer of the present invention will have a weight average molecular weight ($M_w$) of from about 500 Da to about 200,000 Da. In some embodiments, the PEG/PPF block co polymer of the present invention will have a weight average molecular weight ($M_w$) of from about 5000 Da to about 200,000 Da, in other embodiments, from about 20,000 Da to about 200,000 Da, in other embodiments, from about 50,000 Da to about 200,000 Da, in other embodiments, from about 100,000 Da to about 200,000 Da, in other embodiments, from about 150,000 Da to about 200,000 Da, in other embodiments, from about 500 Da to about 150,000 Da, in other embodiments, from about 500 Da to about 100,000 Da, in other embodiments, from about 500 Da to about 75,000 Da, and in other embodiments, from about 500 Da to about 50,000 Da.

In one or more embodiments, the PEG/PPF block co polymer of the present invention will have a mass distribution ($Đ_m$) of 2.0 or less, and preferably 1.5 or less, where $Đ_m=M_w/M_n$. In some embodiments, the PEG/PPF block co polymer of the present invention will have a mass distribution ($Đ_m$) of from about 1.0 to about 2.0, in other embodiments, from about 1.2 to about 2.0, in other embodiments, from about 1.4 to about 2.0, in other embodiments, from about 1.6 to about 2.0, in other embodiments, from about 1.8 to about 2.0, in other embodiments, from about 1.0 to about 1.9, in other embodiments, from about 1.0 to about 1.7, in other embodiments, from about 1.0 to about 1.5, and in other embodiments, from about 1.0 to about 1.3.

In one or more embodiments, the PEG/PPF block co polymers of the present invention will comprise from about 5% to about 95% PEG by weight. In some embodiments, the PEG/PPF block co polymer of the present invention will comprise 20% or more, in other embodiments, 30% or more, in other embodiments, 40% or more, in other embodiments, 50% or more, in other embodiments, 60% or more, and in other embodiments, 70% or more, PEG polymer by weight. In some embodiments, the PEG/PPF block co polymer of the present invention will comprise 90% or less, in other embodiments, 80% or less, in other embodiments, 70% or less, in other embodiments, 60% or less, and in other embodiments, 50% or less. PEG polymer by weight In one or more embodiments, the PEG/PPF block co polymer of the present invention will comprise from about 5% to about 95% PPF by weight. In some embodiments, the PEG/PPF block co polymer of the present invention will comprise 10% or more, in other embodiments, 20% or more, in other embodiments, 30% or more, in other embodiments, 40% or more, in other embodiments, 50% or more, in other embodiments, 60% or more, and in other embodiments, 70% or more, PPF polymer by weight. In some embodiments, the PEG/PPF block co polymer of the present invention will comprise 90% or less, in other embodiments, 80% or less, in other embodiments, 70% or less, in other embodiments, 60% or less, in other embodiments, 50% or less, in other embodiments, 40% or less, and in other embodiments, 30% or less, PPF polymer by weight.

In various embodiments, each PPF block of the PEG/PPF block co polymers of the present invention will have a number average molecular weight ($M_n$) of from about 500 g/mol to about 20,000 g/mol. In some embodiments, each PPF block of the PEG/PPF block co polymers of the present invention will have a number average molecular weight ($M_n$) of from about 1,000 g/mol to about 20,000 g/mol, in other embodiments, from about 3,000 g/mol to about 20,000 g/mol, in other embodiments, from about 7,000 g/mol to about 20,000 g/mol, in other embodiments, from about 10,000 g/mol to about 20,000 g/mol, in other embodiments, from about 15,000 g/mol to about 20,000 g/mol, in other embodiments, from about 500 g/mol to about 15,000 g/mol, in other embodiments, from about 500 g/mol to about 10,000 g/mol, and in other embodiments, from about 500 g/mol to about 5000 g/mol.

In various embodiments, the PEG block of the PEG/PPF block co polymers of the present invention will have a number average molecular weight ($M_n$) of from about 500 g/mol to about 20,000 g/mol. In some embodiments, the PEG block of the PEG/PPF block co polymers of the present invention will have a number average molecular weight ($M_n$) of from about 1,000 g/mol to about 20,000 g/mol, in other embodiments, from about 3,000 g/mol to about 20,000 g/mol, in other embodiments, from about 7,000 g/mol to about 20,000 g/mol, in other embodiments, from about 10,000 g/mol to about 20,000 g/mol, in other embodiments, from about 15,000 g/mol to about 20,000 g/mol, in other embodiments, from about 500 g/mol to about 15,000 g/mol, in other embodiments, from about 500 g/mol to about 10,000 g/mol, and in other embodiments, from about 500 g/mol to about 5000 g/mol.

In one or more embodiments, the PEG/PPF block co polymers of the present invention are water soluble. PEG is a water soluble polymer and, in some embodiments, the PEG block in the PEG/PPF block co polymers of the present invention will render these polymers water soluble. As will be appreciated by those of skill in the art, the point at which the PEG block in these polymer will render them water soluble will depend upon a variety of factors including, but not limited to, the length of the PEG block, the overall molar ratio of PEG to PPF in the polymer, temperature, and pressure. All other things being equal, the higher the ratio of PEG to PPF in the PEG/PPF block co polymers of the present invention, the more water soluble the polymer will be. One of ordinary skill in the art will be able to make a PEG/PPF block co polymers of the present invention that is water soluble without undue experimentation.

In one or more embodiments, the PEG/PPF block co polymer of the present invention is a PEG/PPF di-block copolymer. In one or more embodiments, these PEG/PPF di-block copolymers will have a number average molecular weight ($M_n$) and mass distribution ($Đ_m$) as set forth above. In one or more embodiments, the PPF and PEG blocks of these PEG/PPF di-block copolymers will have a number average molecular weight ($M_n$) as set forth above.

In some of these embodiments, the PEG/PPF block co polymer of the present invention is a PEG/PPF di-block copolymer having the formula:

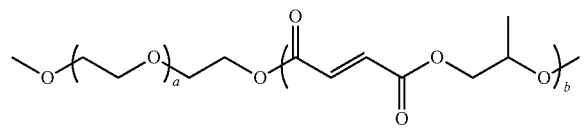

where a is an integer from about 4 to about 100 and b is an integer from about 2 to about 100. In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less. In some embodiments, b will be an integer of 5 or more, in other embodiments, 10 or more, in other embodiments, 20 or more, in other embodiments, 30 or more, in other embodiments, 40 or more, and in other embodiments, 50 or more. In some embodiments, b will be an integer of 90 or less, in other embodiments, 80 or less, in other embodiments, 70 or less, in other embodiments, 60 or less, and in other embodiments, 50 or less.

In some of these embodiments, the PEG/PPF block copolymer of the present invention is a PEG/PPF di-block copolymer having the formula:

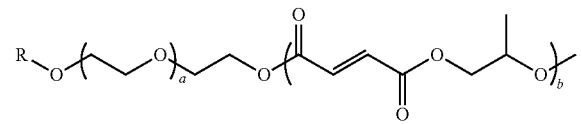

where a is an integer from about 4 to about 100; b is an integer from about 4 to about 100; and R is a functional group selected from the group consisting of methyl groups, benzyl groups, alkyne groups, propargyl groups, allyl groups, alkene groups, 4-dibenzyocyclooctyne groups, cyclooctyne groups, ketone groups, aldehyde groups, tertiary halogen groups, poly(ethylene glycol) groups, and combinations thereof.

In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less. In some embodiments, b will be an integer of 5 or more, in other embodiments, 10 or more, in other embodiments, 20 or more, in other embodiments, 30 or more, in other embodiments, 40 or more, and in other embodiments, 50 or more. In some embodiments, b will be an integer of 90 or less, in other embodiments, 80 or less, in other embodiments, 70 or less, in other embodiments, 60 or less, and in other embodiments, 50 or less.

In one or more embodiments, the PEG/PPF block co polymer of the present invention is a PPF/PEG/PPF tri-block copolymer. In one or more embodiments, these PPF/PEG/PPF tri-block copolymers will have a number average molecular weight ($M_n$) and mass distribution ($Đ_m$) as set forth above. In one or more embodiments, the PPF and PEG blocks of these PPF/PEG/PPF tri-block copolymers will have a number average molecular weight ($M_n$) as set forth above. It should be appreciated that in these embodiments, there are two separate PPF blocks of approximately the same size, so the total $M_n$ of the PPF in these polymers may be from about 1000 g/mol to 40,000 g/mol.

In some of these embodiments, the PEG/PPF block copolymer is a PPF/PEG/PPF tri-block copolymer having the formula:

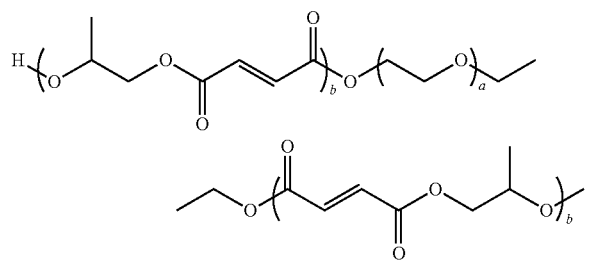

where a is an integer from about 4 to about 100 and each b is an integer from about 2 to about 100. In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less. In some embodiments, each b will be an integer of 5 or more, in other embodiments, 10 or more, in other embodiments, 20 or more, in other embodiments, 30 or more, in other embodiments, 40 or more, and in other embodiments, 50 or more. In some embodiments, each b will be an integer of 90 or less, in other embodiments, 80 or less, in other embodiments, 70 or less, in other embodiments, 60 or less, and in other embodiments, 50 or less.

In another aspect, the present invention is directed to a method for making the PEG/PPF block co polymer described above. In various embodiments, the method begins by dissolving a propylene oxide, maleic anhydride, PEG initiator, and a magnesium catalyst in a suitable solvent. One of ordinary skill in the art will be able to select a suitable solvent for the propylene oxide, maleic anhydride, PEG initiator, and magnesium catalyst without undue experimentation. In various embodiments, suitable solvents for the propylene oxide, maleic anhydride, PEG initiator, and magnesium catalyst may include without limitation toluene, chloroform, dioxane, or tetrahydrofuran (THF). In some embodiments, the propylene oxide, maleic anhydride, PEG initiator, and magnesium catalyst are dissolved in toluene. In some embodiments, the magnesium catalyst may be $Mg(BHT)_2(THF)_2$, $MgEt_2$, or a combination thereof, but is preferably $Mg(BHT)_2(THF)_2$.

In some of these embodiments, the PEG initiator has a number average molecular weight ($M_n$) of from about 100 Da to about 40,000 Da. In some embodiments, the PEG initiator will have a number average molecular weight ($M_n$) of 1000 Da or more, in other embodiments, 2000 Da or more, in other embodiments, 3000 Da or more, in other embodiments, 4000 Da or more, in other embodiments, 5000 Da or more, in other embodiments, 6000 Da or more, and in other embodiments, 7000 Da or more. In some embodiments, the PEG initiator will have a number average molecular weight ($M_n$) of 9000 Da or less, in other embodiments, 80,000 Da or less, in other embodiments, 7000 Da or less, in other embodiments, 6000 Da or less, in other embodiments, 5000 Da or less, in other embodiments, 4000 Da or less, in other embodiments, 3000 or less.

In some of these embodiments, the PEG initiator has from about 2 to about 50 ethylene glycol units. In some embodiments, the PEG initiator will have 5 or more, in other embodiments, 10 or more, in other embodiments, 15 or more, in other embodiments, 20 or more, in other embodiments, 25 or more, and in other embodiments, 30 or more ethylene glycol units. In some embodiments, the PEG initiator will have 45 or less, in other embodiments, 40 or less, in other embodiments, 35 or less, in other embodiments, 30 or less, in other embodiments, 25 or less, in other embodiments, 20 or less ethylene glycol units.

In some of these embodiments, the PEG initiator is mono-functional, having a single functional hydroxyl group. As will apparent, in embodiments where the PEG initiator is mono-functional will produce PEG/PPF di-block copolymers. In some of these embodiments, the PEG initiator is methyl ether PEG having a number average molecular weight ($M_n$) of from about 100 to about 10,000 In some embodiments, the PEG initiator will be a methyl ether PEG having a number average molecular weight ($M_n$) of 1000 Da or more, in other embodiments, 2000 Da or more, in other embodiments, 3000 Da or more, in other embodiments, 4000 Da or more, in other embodiments, 5000 Da or more, in other embodiments, 6000 Da or more, and in other embodiments, 7,000 Da or more. In some embodiments, the PEG initiator will be a methyl ether PEG having a number average molecular weight ($M_n$) of 9000 Da or less, in other embodiments, 8000 Da or less, in other embodiments, 7000 Da or less, in other embodiments, 6000 Da or less, in other embodiments, 5000 Da or less, in other embodiments, 4000 Da or less, in other embodiments, 3000 or less.

In one or more embodiment, the PEG initiator is a mono-functional PEG having the formula:

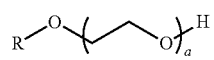

where a is an integer from about 4 to about 100; and R is a functional group selected from the group consisting of methyl groups, benzyl groups, alkyne groups, propargyl groups, allyl groups, alkene groups, 4-dibenzyocyclooctyne groups, cyclooctyne groups, ketone groups, aldehyde groups, tertiary halogen groups, poly(ethylene glycol) groups, and combinations thereof. In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less.

In some of other embodiments, the PEG initiator is a diol. As will apparent, embodiments where the PEG initiator is a diol, the method of the present invention will produce PPF/PEG/PPF tri-block copolymers. In one or more embodiments, the PEG diol may have the formula:

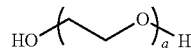

where a is an integer from about 4 to about 100. In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less.

In some of these embodiments, the PEG initiator is a PEG diol having a number average molecular weight ($M_n$) of from about 100 Da to about 40,000 Da. In some embodiments, the PEG initiator will be a PEG diol having a number average molecular weight ($M_n$) of 1000 Da or more, in other embodiments, 2000 Da or more, in other embodiments, 3000 Da or more, in other embodiments, 4000 Da or more, in other embodiments, 5000 Da or more, in other embodiments, 6000 Da or more, and in other embodiments, 7,000 Da or more. In some embodiments, the PEG initiator will be a PEG diol having a number average molecular weight ($M_n$) of 9000 Da or less, in other embodiments, 8000 Da or less, in other embodiments, 7000 Da or less, in other embodiments, 6000 Da or less, in other embodiments, 5000 Da or less, in other embodiments, 4000 Da or less, in other embodiments, 3000 or less.

In various embodiments, the concentration of the propylene oxide and maleic anhydride monomers in the solution is from about 0.5M to about 8M. In some embodiments, the concentration of the propylene oxide and maleic anhydride monomers is from about 1M to about 8M, in other embodiments, from about 2M to about 8M, in other embodiments, from about 4M to about 8M, in other embodiments, from about 0.5M to about 6M, in other embodiments, from about 0.5M to about 4M, and in other embodiments, from about 1M to about 3M. In some embodiments, the concentration of the propylene oxide and maleic anhydride monomers is 2M. In some embodiments, the magnesium catalyst is $Mg(BHT)_2(THF)_2$.

Next, the solution is heated to a temperature of from about 40° C. to about 80° C. for from about 1 hours to about 48 hours to produce a poly(ethylene glycol-b-propylene maleate) or poly(propylene maleate-b-ethylene glycol-b-propylene maleate) intermediate. In some embodiments, the solution is heated to a temperature of from about 50° C. to about 80° C., in other embodiments, from about 60° C. to about 80° C., in other embodiments, from about 70 to about 80° C., in other embodiments, from about 40° C. to about 70° C., in other embodiments, from about 40° C. to about 60° C., and in other embodiments, from about 40° C. to about 50° C. In some embodiments, the solution is heated for from about 1 h to about 40 h, in other embodiments, from about 1 h to about 30 h, in other embodiments, from about 1 h to about 20 h, in other embodiments, from about 10 h to about 48 h, and in other embodiments, from about 20 h to about 48 h. In some embodiments, the solution is heated to a temperature of 100° C. for 72 hours.

In some embodiments, the degree of polymerization is from about 2 to about 100, in other embodiments, from about 2 to about 75, in other embodiments, from about 2 to about 50, in other embodiments, from about 2 to about 25, in other embodiments, from about 25 to about 100, in other embodiments, from about 50 to about 100, and in other embodiments, from about 75 to about 100.

The poly(ethylene glycol-b-propylene maleate) or poly(propylene maleate-b-ethylene glycol-b-propylene maleate) intermediate may be collected and purified by any method known in the art for that purpose. One of ordinary skill in the art will be able to collect and purify the poly(ethylene glycol-b-propylene maleate) or poly(propylene maleate-b-ethylene glycol-b-propylene maleate) intermediate without undue experimentation. In one or more embodiment, the poly(ethylene glycol-b-propylene maleate) or poly(propylene maleate-b-ethylene glycol-b-propylene maleate) intermediate is collected and purified by precipitation in excess diethyl ether. In some embodiments, the intermediate is again collected and purified by washing in a phosphate buffer solution to remove any unreacted PEG.

Next, the cis double bonds in the maleate groups in poly(ethylene glycol-b-propylene maleate) or poly(propylene maleate-b-ethylene glycol-b-propylene maleate) intermediate are isomerized into their fumarate counterparts by dissolving the poly(ethylene glycol-b-propylene maleate) or poly(propylene maleate-b-ethylene glycol-b-propylene maleate) intermediate in a suitable solvent, adding diethylamine and heating the solution of step C to reflux for from about 1 to about 24 hours to produce a block co polymer according to one or more embodiments of the present invention.

One of ordinary skill in the art will be able to select a suitable solvent for the poly(ethylene glycol-b-propylene maleate) or poly(propylene maleate-b-ethylene glycol-b-propylene maleate) intermediate without undue experimentation. Suitable solvents may include, without limitation, chloroform, dichloromethane, and combinations thereof. In some of these embodiments, the poly(ethylene glycol-b-propylene maleate) or poly(propylene maleate-b-ethylene glycol-b-propylene maleate) intermediate is dissolved in chloroform.

In some embodiments, the poly(ethylene glycol-b-propylene maleate) or poly(propylene maleate-b-ethylene glycol-b-propylene maleate) intermediate/diethylamine solution may be heated to reflux for from about 1 to about 20 hours, in other embodiments, from about 1 to about 15 hours, from about 1 to about 10 hours, from about 5 to about 24 hours, from about 10 to about 24 hours, from about 15 to about 24 hours to produce a block co polymer according to one or more embodiments of the present invention.

The block co polymers of the present invention may be collected and purified by any method known in the art for that purpose. One of ordinary skill in the art will be able to collect and purify block co polymers of the present invention without undue experimentation. In one or more embodiment, block co polymers of the present invention may be collected and purified by precipitation in excess hexane.

In some embodiments, the block co polymers of the present invention may be a diblock copolymer synthesized as shown in Scheme 1, below:

Scheme 1

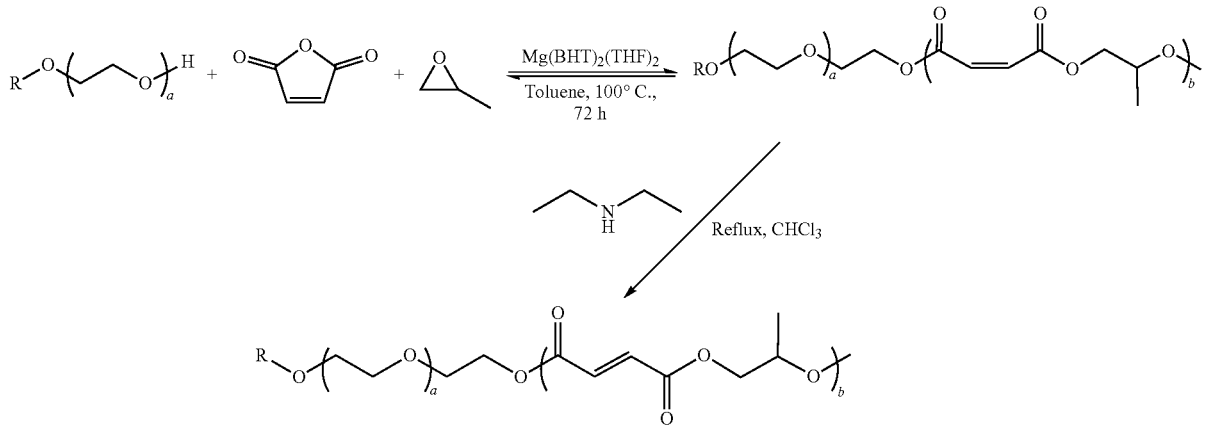

where a is an integer from about 4 to about 100; b is an integer from about 2 to about 100; and R is a functional group selected from the group consisting of methyl groups, In some embodiments, the block co polymers of the present invention may be a triblock copolymer synthesized as shown in Scheme 2, below:

Scheme 2

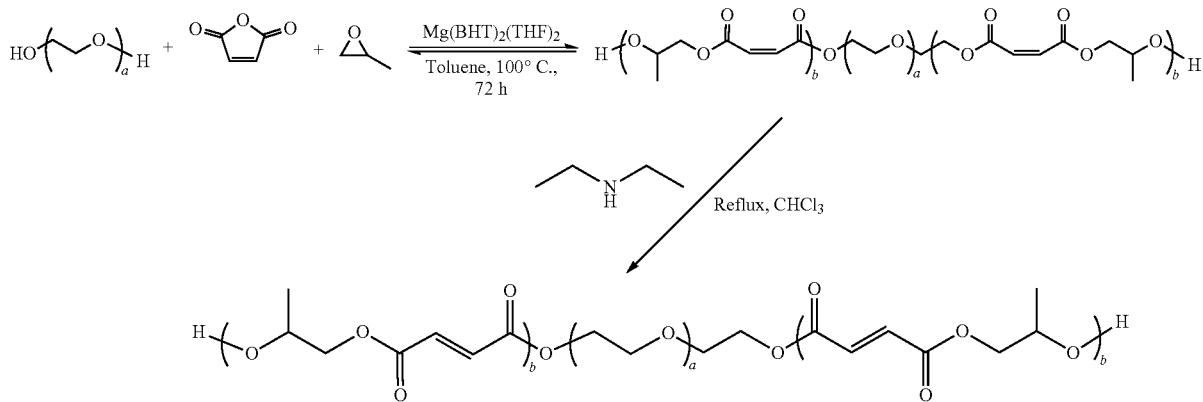

benzyl groups, alkyne groups, propargyl groups, allyl groups, alkene groups, 4-dibenzyocyclooctyne groups, cyclooctyne groups, ketone groups, aldehyde groups, tertiary halogen groups, poly(ethylene glycol) groups, and combinations thereof. In various embodiments, R is a methyl group. In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less. In some embodiments, b will be an integer of 5 or more, in other embodiments, 10 or more, in other embodiments, 20 or more, in other embodiments, 30 or more, in other embodiments, 40 or more, and in other embodiments, 50 or more. In some embodiments, b will be an integer of 90 or less, in other embodiments, 80 or less, in other embodiments, 70 or less, in other embodiments, 60 or less, and in other embodiments, 50 or less.

where a is an integer from about 4 to about 100; and each b is an integer from about 2 to about 100. In some embodiments, a will be an integer of 10 or more, in other embodiments, 20 or more, in other embodiments, 30 or more, in other embodiments, 40 or more, in other embodiments, 50 or more, and in other embodiments, 60 or more. In some embodiments, a will be an integer of 90 or less, in other embodiments, 80 or less, in other embodiments, 70 or less, in other embodiments, 60 or less, and in other embodiments, 50 or less. In some embodiments, b will be an integer of 5 or more, in other embodiments, 10 or more, in other embodiments, 20 or more, in other embodiments, 30 or more, in other embodiments, 40 or more, and in other embodiments, 50 or more. In some embodiments, b will be an integer of 90 or less, in other embodiments, 80 or less, in other embodiments, 70 or less, in other embodiments, 60 or less, and in other embodiments, 50 or less.

In another aspect, the present invention is directed to a hydrogel comprising the PEG/PPF block copolymers described above. One of ordinary skill in the art will be able to form a hydrogel using the block copolymers of the present invention without undue experimentation. In one or more of these embodiments, a water miscible and/or soluble species of the PEG/PPF block copolymer, as described above, is hydrated with water and a water soluble photoinitiator, and then irradiated with ultraviolet light at an appropriate wavelength for the photoinitiator chosen, to cure the polymer and form a hydrogel. Suitable water soluble photoinitiators may include, without limitation, lithium acylphosphinate (LAP).

In various embodiments, the PEG/PPF block copolymer will comprise from about 2 to about 50 weight percent of these hydrogels. In some embodiments, the PEG/PPF block copolymer will comprise from about 5 wt. % to about 50 wt. %, on other embodiments, from about 10 wt. % to about 50 wt. %, on other embodiments, from about 15 wt. % to about 50 wt. %, on other embodiments, from about 20 wt. % to about 50 wt. %, on other embodiments, from about 25 wt. % to about 50 wt. %, on other embodiments, from about 2 wt. % to about 40 wt. %, on other embodiments, from about 2 wt. % to about 30 wt. %, on other embodiments, from about 2 wt. % to about 20 wt. % of these hydrogels. In some embodiments, PEG/PPF block copolymer will comprise from about 20 to about 25 weight percent of these hydrogels In another aspect, the present invention is directed to a micelle comprising the PEG/PPF diblock copolymers discussed above. In these embodiments, the diblock copolymers of the present invention are dissolved in a suitable solvent for both PEG and PPF, such as chloroform, dichloromethane, tetrahydrofuran (THF), 1,4-dioxane, N,N-dimethylformamide and then water or an aqueous buffer solution is slowly added to the PEG/PPF diblock copolymer containing solution to form micelles. One of ordinary skill in the art will be able to form a micelle using the block copolymers of the present invention without undue experimentation.

In another aspect, the present invention is directed to a method of 3D-printed polymeric structure comprising the block copolymer comprising the PEG/PPF block copolymers described above. In various embodiments, the PEG/PPF block copolymers of the present invention can be formed into 3D polymeric structures having virtually any shape using conventional additive manufacturing (3D printing) techniques, such as continuous digital light processing (cDLP) techniques. In these embodiments, a PEG/PPF block copolymers is first selected and used to form a 3D printable resin having a viscosity suitable for the device being used (generally from about 0.001 cP to about 10.0 cP) and, preferably, containing at least one photoinitiator. In one or more embodiments, the resin is diluted with DEF, or another suitable solvent such as dioxane, tetrahydrofuran (THF), or dimethylformamide (DMF), to a viscosity suitable for printing. The photoinitiators are not particularly limited but must be capable of generating radicles at the wavelengths of light used by the 3D-printing device being used and should be soluble in the resin being used. In various embodiments, suitable photoinitiators may include, without limitation, bis-acylphosphine oxide (BAPO), and IRGACURE™ 2959, IRGACURE™ 784. In some embodiments, the 3D printable resin containing the PEG/PPF block copolymers of the present invention may be made as set forth in Dean, D.; Jonathan, W.; Siblani, A.; Wang, M. O.; Kim, K.; Mikos, A. G.; Fisher, J. P. Continuous Digital Light Processing (CDLP): Highly Accurate Additive Manufacturing of Tissue Engineered Bone Scaffolds. *Virtual Phys. Prototyp.* 2012, 7 (1), 13-24, the disclosure of which is incorporated herein by reference in its entirety.

Once formed, these 3D-printable resins may be printed into 3D polymeric structures using conventional continuous digital light processing (cDLP) techniques.

EXPERIMENTAL

Figure 1B:
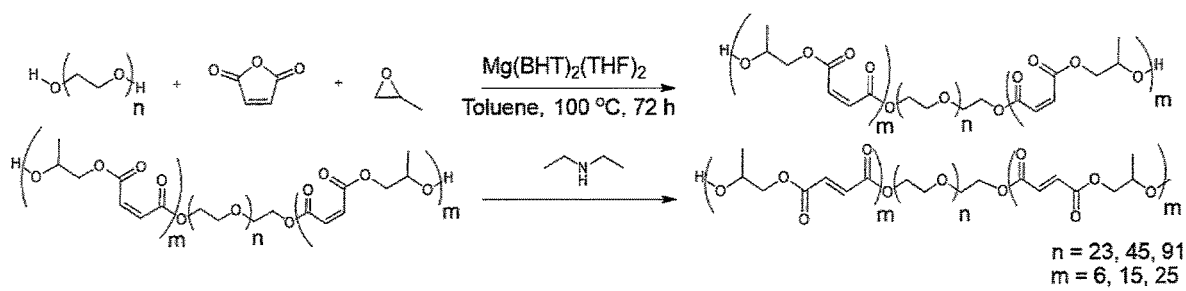
Figure 2A:
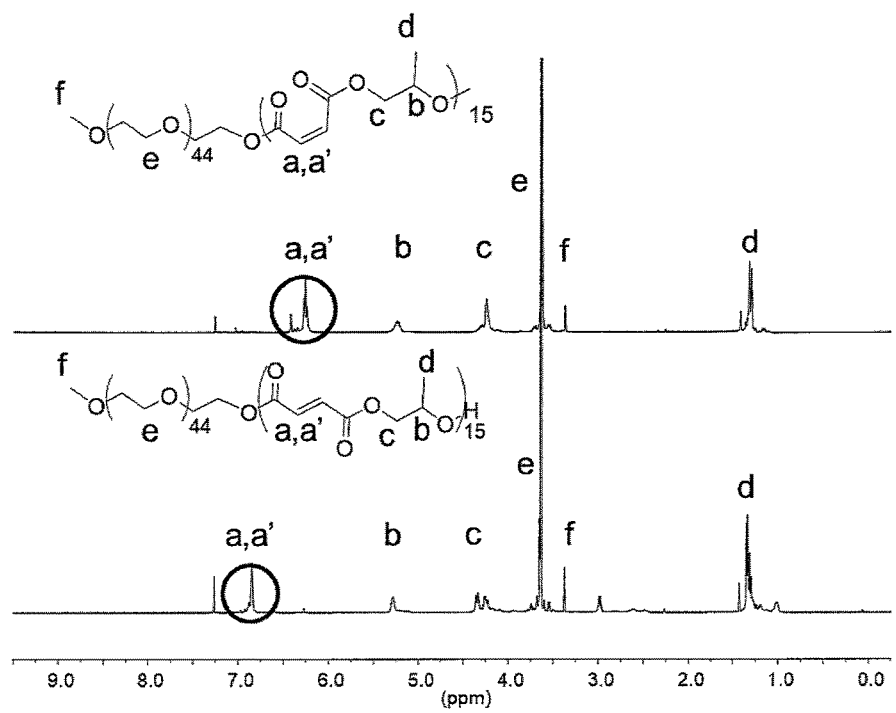
FIG. 2 are $^1H$ NMR spectra showing the results of isomerization using diethylamine as a catalyst to yield the poly(ethylene glycol-b-propylene fumarate) (FIG. 2A) and poly(propylene fumarate-b-ethylene glycol-b-propylene fumarate) (FIG. 2B) copolymers of the present invention.
Figure 2B:
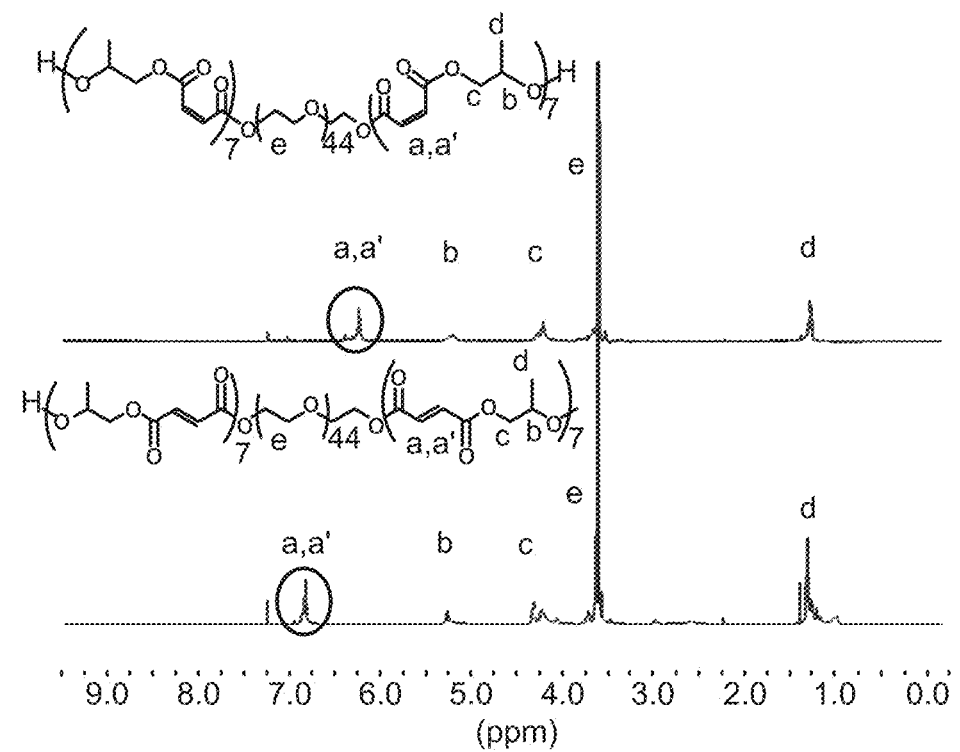
Figure 3:
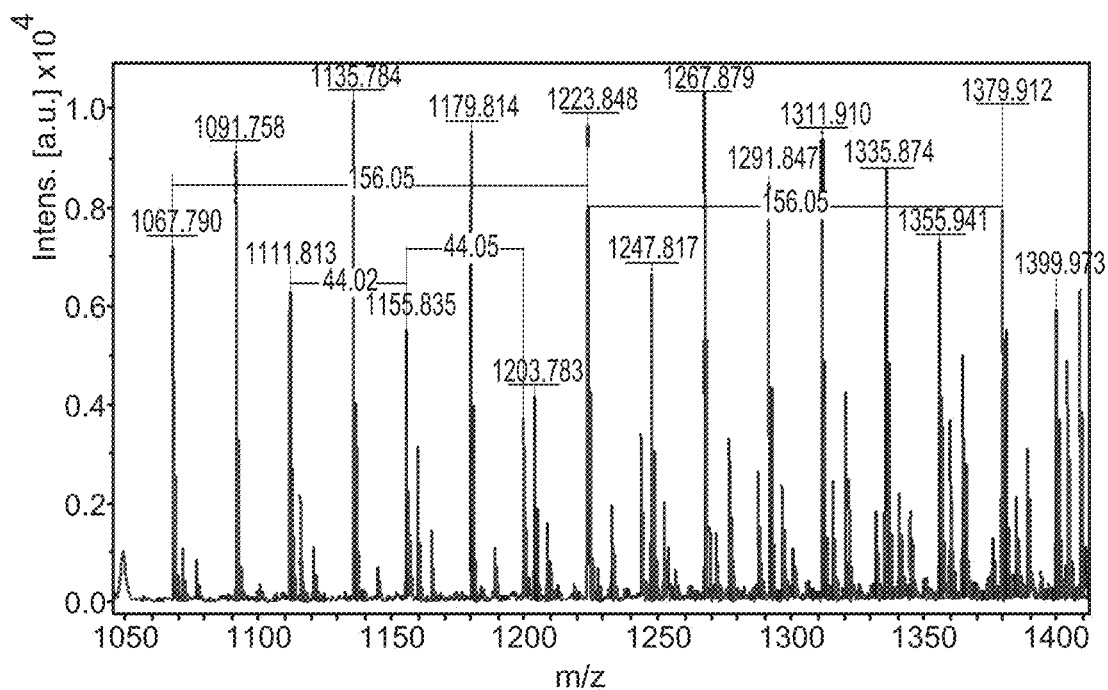
FIG. 3 is a MALDI-TOF spectrum of poly(propylene fumarate-b-ethylene glycol-b-propylene fumarate).
Figure 4A:
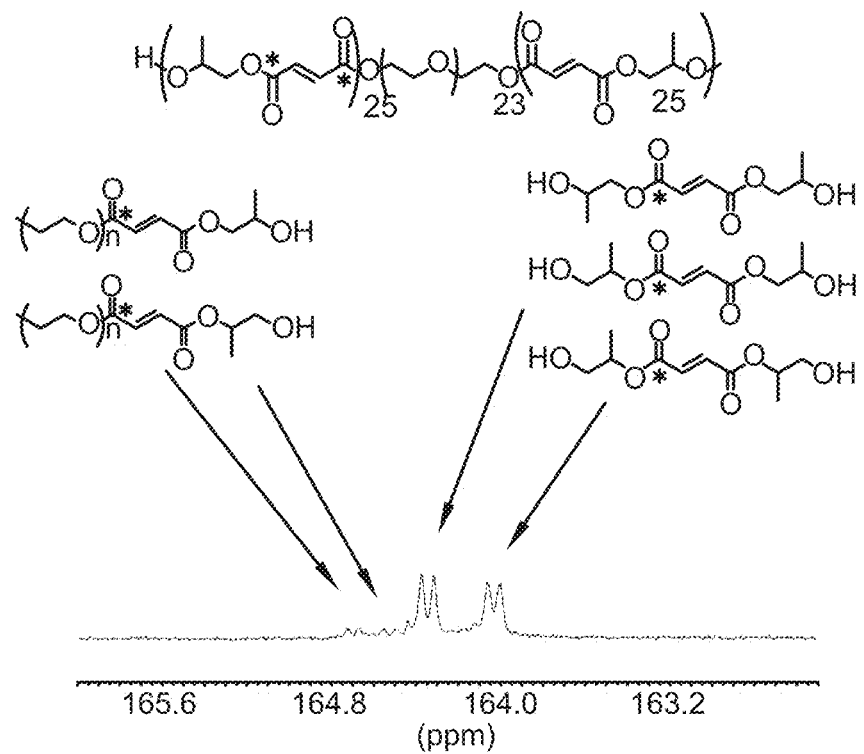
FIGS. 4A-B are quantitative $^{13}C$ NMR spectroscopy spectra of a $PPF_mPEG_nPPF_m$ triblock copolymer of the present invention indicating a sharp block interface by the low integrations of (FIG. 4A) carbonyl diad resonances in PPF adjacent to PEG subunits and (FIG. 4B) the PEG resonance adjacent to PPF subunits.
Figure 4B:
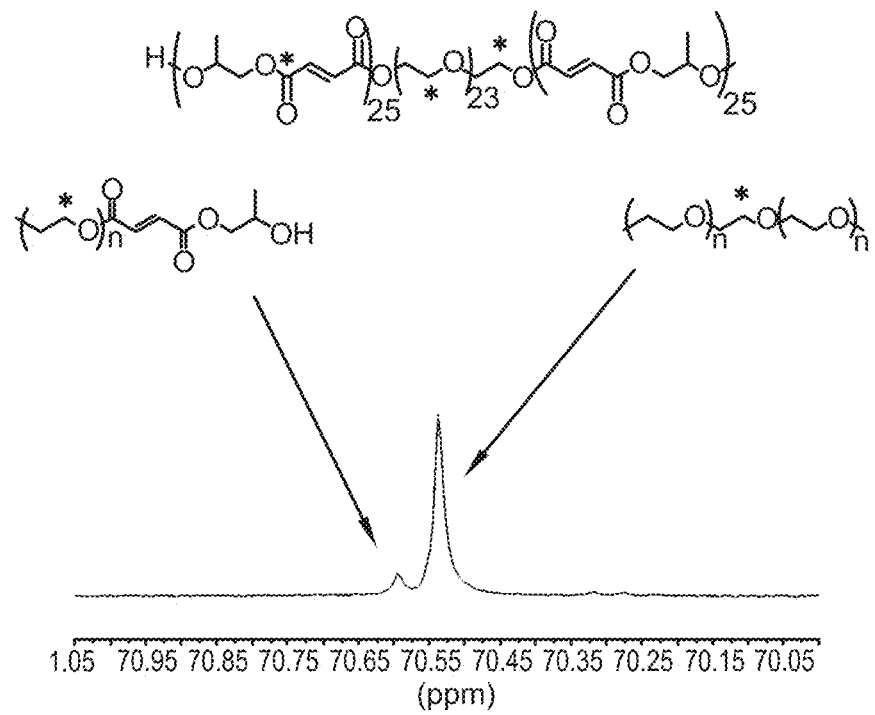
Figure 5A:
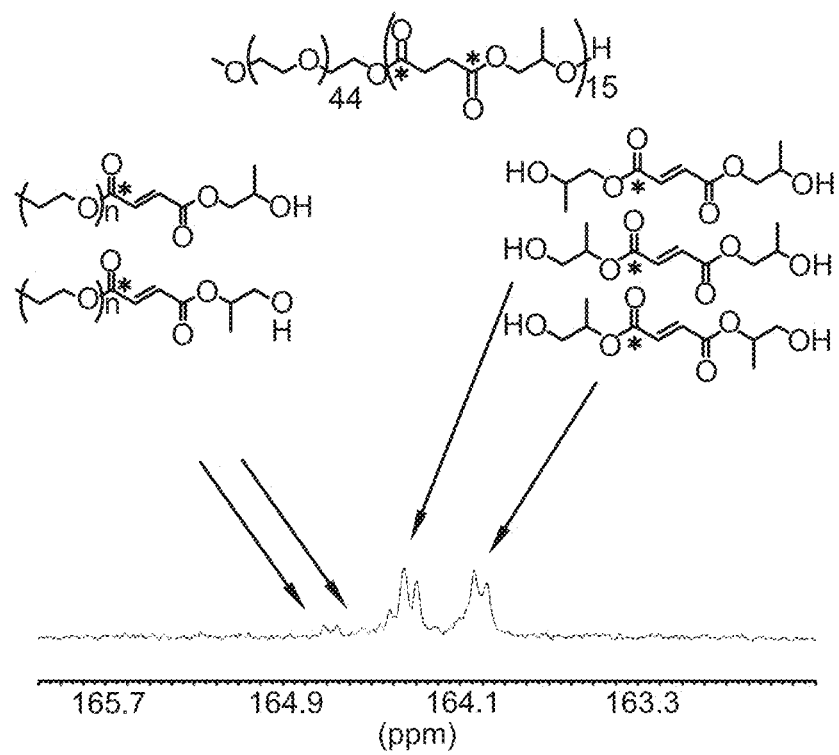
FIGS. 5A-B are quantitative $^{13}C$ NMR spectroscopy spectra of a $PEG_nPPF_m$ diblock copolymer indicating a sharp block interface by the low integrations of (FIG. 5A) carbonyl diad resonances in PPF adjacent to PEG subunits and (FIG. 5B) the PEG resonance adjacent to PPF subunits.
Figure 5B:
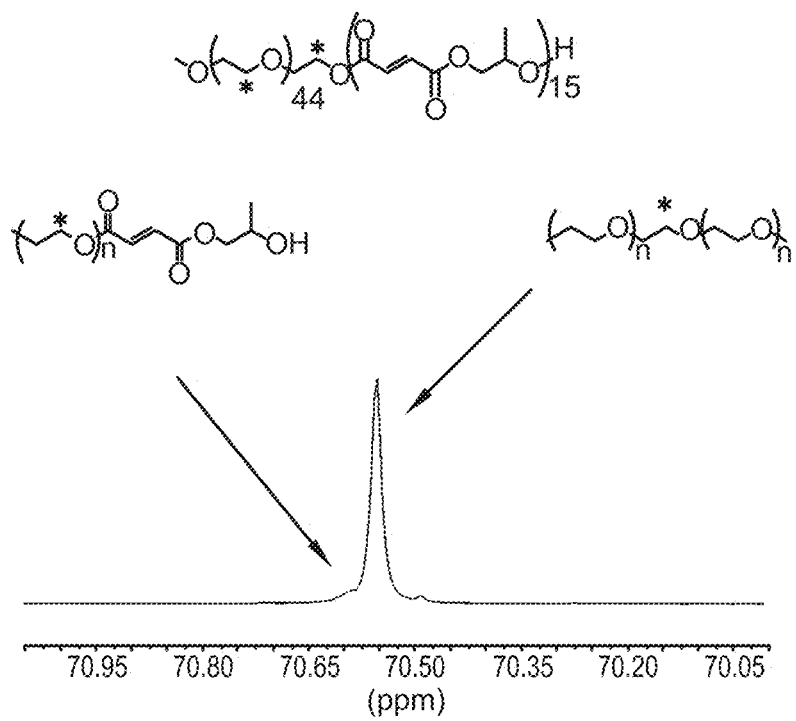

In order to evaluate and further reduce the invention to practice, poly(propylene maleate) (PPM) was formed from the alternating ROCOP of MA and PO in the presence of $Mg(BHT)_2(THF)_2$ catalyst, initiated from the alcohol chain end of both methyl ether PEG and PEG-diol to form diblock ($PEG_nPPM_m$) and triblock ($PPM_mPEG_nPPM_m$) copolymers (See, FIGS. 1A, 1B; Table 1). Using a molar ratio of 1:5 (catalyst:initiator), polymerizations exceeded 90% conversion in all cases except for entries 2 and 6 as determined by integration of the maleic anhydride peak in $^1H$ NMR spectroscopy. The lower conversions can be attributed to larger head space in the reaction vessel: PO boils at 34° C. and must be condensed back into solution. It was experimentally determined that by minimizing this head space, the reaction could be driven to high conversion. The polymers were then isomerized to the $PEG_nPPF_m$ and $PPF_mPEG_nPPF_m$ species by treatment with diethylamine (See, FIGS. 2A-B). The final polymer products were characterized by MALDI-TOF mass spectrometry to show the PPF repeat unit of 156 Da and the PEG repeat unit of 44 Da (See, FIG. 3).

TABLE 1

Synthesis of PEGPPF Diblock and Triblock Copolymers

| Entry | PEG Initiator[a] | Target DP PPF[b] | Temperature (° C.) | Time (days) | MA Conversion (%) | $M_n^c$ (kDa) | $M_n^d$ (kDa) | $M_w^c$ (kDa) | $Đ_M^c$ |
|---|---|---|---|---|---|---|---|---|---|
| 1 | m 1000 | 6 | 100 | 3 | 94 | 2.4 | 1.9 | 3.7 | 1.59 |
| 2 | m 1000 | 15 | 100 | 4 | 75 | 2.2 | 2.6 | 3.4 | 1.55 |
| 3 | m 1000 | 25 | 100 | 5 | 91 | 1.6 | 3.5 | 2.2 | 1.38 |
| 4 | m 2000 | 6 | 100 | 3 | 94 | 1.6 | 3.0 | 2.0 | 1.25 |
| 5 | m 2000 | 15 | 100 | 4 | 83 | 2.6 | 4.6 | 4.5 | 1.70 |
| 6 | m 2000 | 25 | 100 | 5 | 70 | 2.6 | 5.1 | 3.1 | 1.31 |
| 7 | m 4000 | 6 | 100 | 3 | 93 | 5.2 | 5.1 | 7.0 | 1.36 |
| 8 | m 4000 | 15 | 100 | 4 | 93 | 2.1 | 6.6 | 4.3 | 1.49 |
| 9 | m 4000 | 25 | 100 | 5 | 94 | 3.9 | 7.0 | 4.4 | 1.12 |
| 10 | d 1000 | 6 | 100 | 3 | 88 | 4.4 | — | 7.2 | 1.65 |
| 11 | d 1000 | 15 | 100 | 4 | 94 | 2.6 | — | 2.9 | 1.11 |
| 12 | d 1000 | 25 | 100 | 5 | 95 | 3.9 | — | 6.2 | 1.57 |
| 13 | d 2000 | 6 | 100 | 3 | 93 | 0.5 | — | 0.5 | 1.12 |
| 14 | d 2000 | 15 | 100 | 4 | 95 | 3.6 | — | 4.9 | 1.49 |
| 15 | d 2000 | 25 | 100 | 5 | 97 | 4.6 | — | 7.5 | 1.61 |
| 16 | d 4000 | 6 | 100 | 3 | 91 | 4.3 | — | 7.2 | 1.65 |

TABLE 1-continued

Synthesis of PEGPPF Diblock and Triblock Copolymers

| Entry | PEG Initiator[a] | Target DP PPF[b] | Temperature (° C.) | Time (days) | MA Conversion (%) | $M_n^c$ (kDa) | $M_n^d$ (kDa) | $M_w^c$ (kDa) | $Đ_M^c$ |
|---|---|---|---|---|---|---|---|---|---|
| 17 | d 4000 | 15 | 100 | 4 | 99 | 6.7 | — | 10.0 | 1.51 |
| 18 | d 4000 | 25 | 100 | 5 | 94 | 4.3 | — | 8.3 | 1.92 |

[a]Where m = methyl ether PEG, d = PEG-diol and values indicates molecular mass (Da).
[b]Based on an initiator-to-monomer ratio.
[c]Based on SEC against poly(styrene) standards.
[d]Based on end-group analysis using $^1H$ NMR spectroscopy.

To demonstrate that well-defined block copolymers had been synthesized diffusion-ordered NMR spectroscopy (DOSY-NMR) and quantitative $^{13}C$ NMR spectroscopy experiments were employed. (FIGS. 4A-B, 5A-B) Furthermore, in the $^{13}C$ NMR spectra, the carbonyl diad resonances of the PPF repeat unit (δ=164.4 and 164.0 ppm) are split by PEG carbons adjacent to them. As the integration values of the carbonyl PPF peaks adjacent to PEG are lower than those adjacent to PPF, it stands to reason that a sharp interface between the two blocks exist. This can also be observed from the PEG peak (δ=70.55 ppm) which is split by the PPF block interface.

Small Angle Oscillatory Shear Rheology cDLP additive manufacturing involves crosslinking a photo-reactive polymer resin into a solid using ultraviolet light. This technique requires sufficiently low resin viscosities (i.e. <3 Pa·s) to allow the polymer to flow into the void space as the printed product is raised out of the resin. The resin form of pure $PPF_3PEG_{23}PPF_3$ block copolymer has a complex viscosity of about 35-50 Pa·s measured by small angle oscillatory shear (SAOS) rheology. These values are far too viscous for this manufacturing method and therefore must be diluted. DEF has been shown to be well suited for this purpose, as a solution with a 1:1 ratio of polymer:DEF easily produces a usable viscosity (<1 Pa·s) for homopolymer PPF. Similarly, 3:1 and 1:1 ratios of DEF: $PPF_mPEG_nPPF_m$ yielded viscosities<3 Pa·s for all variants of $PPF_mPEG_{23}PPF_m$ as well as $PEG_{23}PPF_m$ (See, FIG. 6).

cDLP Printing with DEF-Resin $PPF_mPEG_{23}PPF_m$ (i.e. 1 kDa PEG) triblock copolymers were successfully printed using a 1:1 mass ratio of polymer:DEF. A mixture of three photoinitiators previously formulated by Dean et al. were added: 3 wt. % BAPO, an acylphosphine photoinitiator, 0.4% IRGACURE™ 784, a titanocene-based initiator/light scattering agent, and 0.7% oxybenzone, a radical scavenger. (See, Dean, D.; Jonathan, W.; Siblani, A.; Wang, M. O.; Kim, K.; Mikos, A. G.; Fisher, J. P. Continuous Digital Light Processing (CDLP): Highly Accurate Additive Manufacturing of Tissue Engineered Bone Scaffolds. *Virtual Phys. Prototyp.* 2012, 7 (1), 13-24, the disclosure of which is incorporated herein by reference in its entirety.) To demonstrate the print resolution of $PPF_3PEG_{23}PPF_3$ polymer, a gyroidal scaffold with strut sizes ~100 μm in diameter was printed from a computer-generated model (FIGS. 7A-B). An optical image of the printed structure demonstrates the high resolution of $PPF_3PEG_{23}PPF_3$ from cDLP printing.

cDLP Printing in Aqueous Solution.

Figure 8:
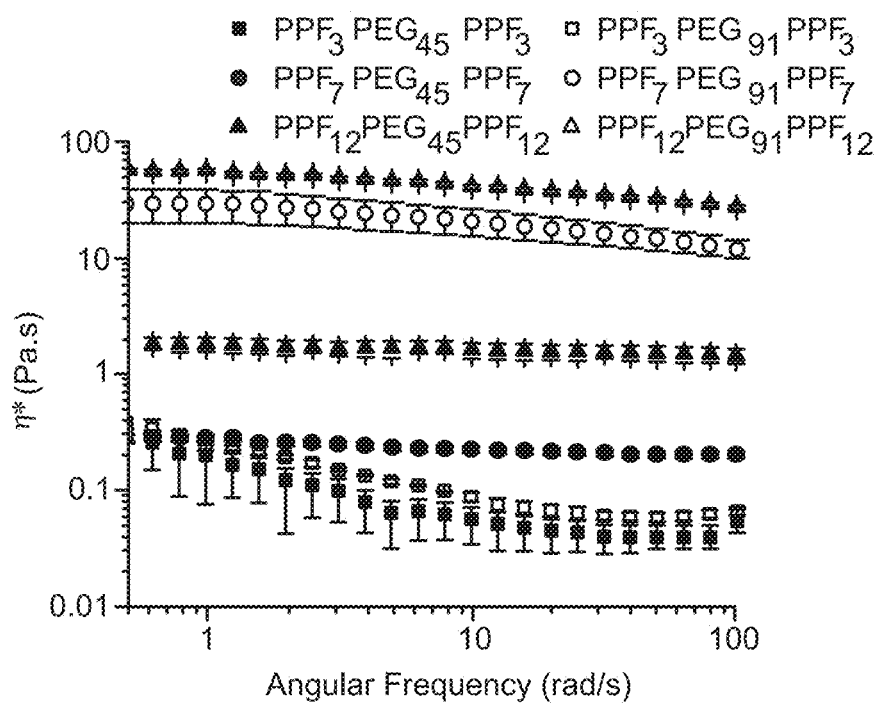
FIG. 8 is a graph showing the viscosity of certain water soluble $PPF_mPEG_nPPF_m$ copolymers. $PPF_mPEG_nPPF_m$ copolymers with PEG content >2000 Da were found to produce suitable viscosities for cDLP at ~25 wt. % polymer.

For tested $PPF_mPEG_nPPF_m$ species with PEG block>1000 Da the polymers are insoluble in DEF, limiting its use as a viscosity modifier. Fortuitously, above a PEG block mass of 2000 Da (i.e. $PEG_{45}$ and $PEG_{91}$) the polymers become water-soluble and when dissolved yield usable viscosities for cDLP printing with η*<3 Pa·s (FIG. 8). This provides a two-fold advantage over previously utilized PPF:DEF mixtures by simultaneously achieving usable viscosities as well as removing the need for DEF, which as a reactive diluent is incorporated into printed scaffolds and therefore changes the material properties.

One challenge with cDLP is selecting a photoinitiator for a printing formulation. To crosslink the water soluble polymers for these experiments, the photoinitiator lithium acylphosphinate (LAP) was used. In addition to water solubility, LAP also has a much higher molar absorptivity coefficient when compared to the widely used IRGACURE™ 2959 (in the range of 340-420 nm). Furthermore, it is also cytocompatible making it an ideal photoinitiator for cross-linking water-soluble PEGPPF.[34] As the printer emits light at 405 nm this combination of properties made LAP an ideal choice to attempt cDLP printing from an aqueous solution, which proved fruitful in the successful printing of $PPF_3PEG_{45}PPF_3$.

Molded PEGPPF Hydrogels.

Figure 9:
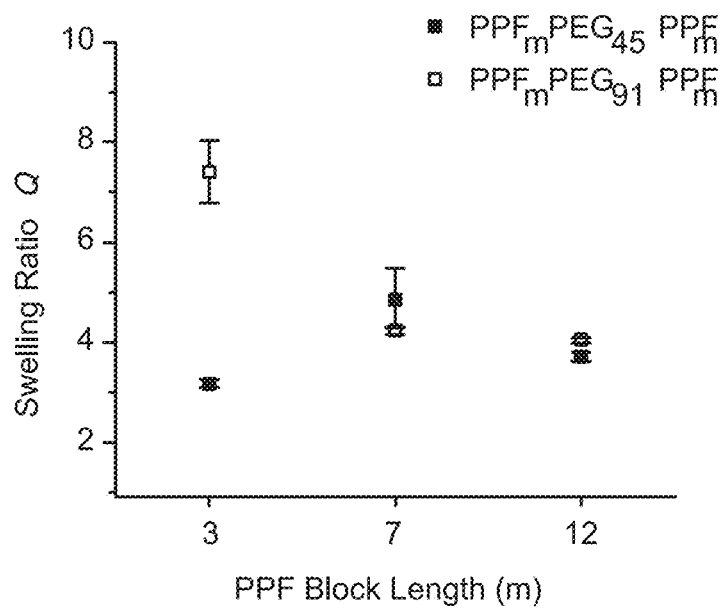
FIG. 9 is a graph showing the results of swelling tests performed on $PPF_mPEG_{45}PPF_m$ and $PPF_mPEG_{91}PPF_m$ hydrogels.

The water-soluble species of $PPF_mPEG_nPPF_m$ (i.e. $PEG_{45}$ and $PEG_{91}$ blocks) were photo-crosslinked into hydrogels to examine their swelling properties and cell viability. Each gel was cast at 25 wt. % in water with a 5:1 molar ratio of reactive center (double bond):LAP to ensure uniform cross-linking. The swelling of $PPF_mPEG_{91}PPF_m$ (i.e. 4 kDa PEG) species is much higher than $PPF_mPEG_{45}PPF_m$ for short PPF block lengths but quickly converges as the PPF block length increases (FIG. 9). This is a consequence of the increasing quantity of cross-linking sites which decrease the distance between cross-links and suppress swelling of the scaffold. Furthermore, the PPF block length increases concomitantly with hydrophobicity, which promotes the aggregation of the reactive centers compared to the shorter chains and potentially increases the number of cross-links formed.

Tensile Properties of 3D Printed $PPF_mPEG_nPPF_m$ Hydrogels.

Figure 10:
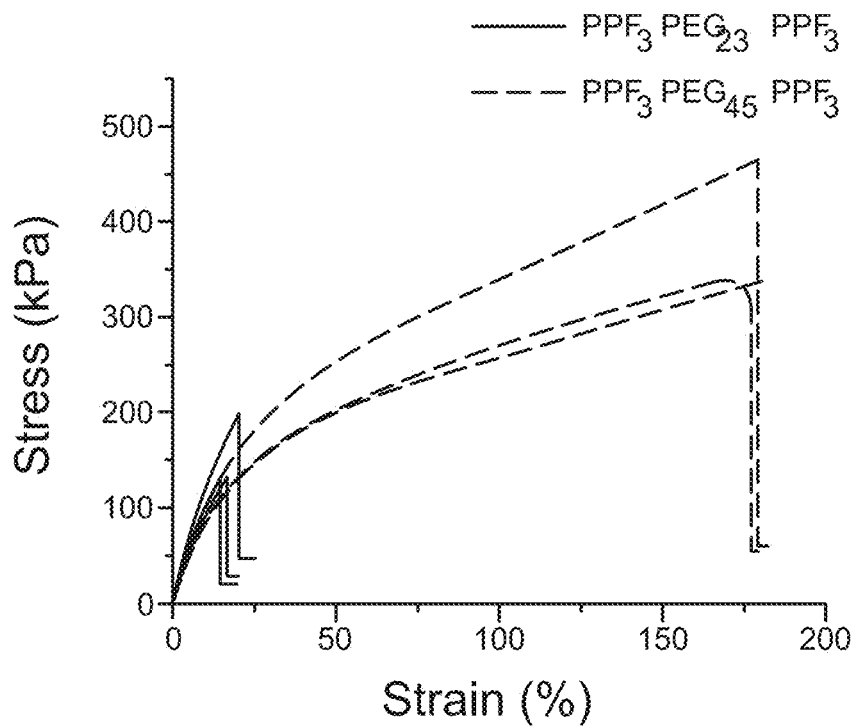
FIG. 10 is a graph showing tensile stress-strain curves for water-printed $PPF_3PEG_{45}PPF_3$ and DEF-printed $PPF_3PEG_{23}PPF_3$ hydrogels.
Figure 11:
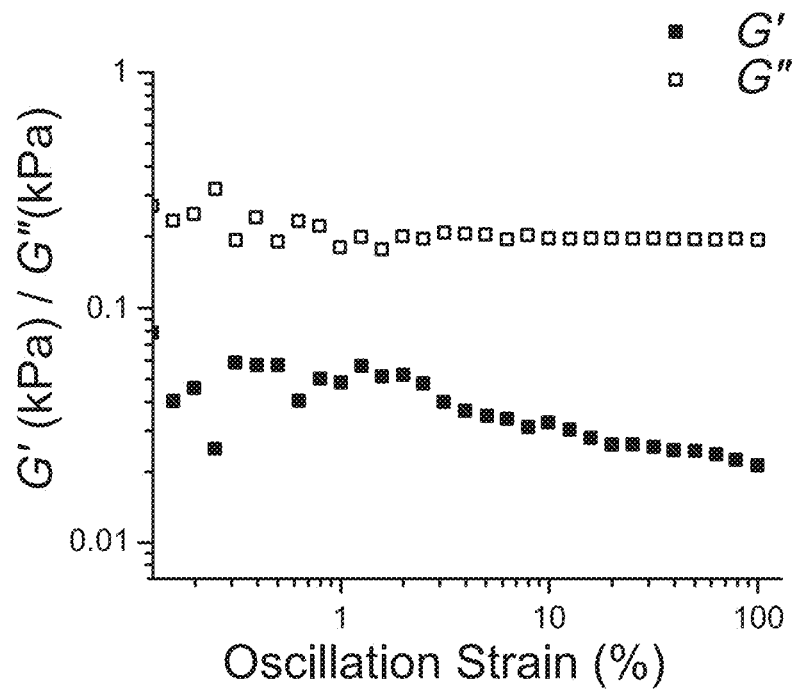
FIG. 11 is a graph showing the results of a strain sweep of $PPF_7PEG_{45}PPF_7$ 25 wt. % in water.
Figure 12:
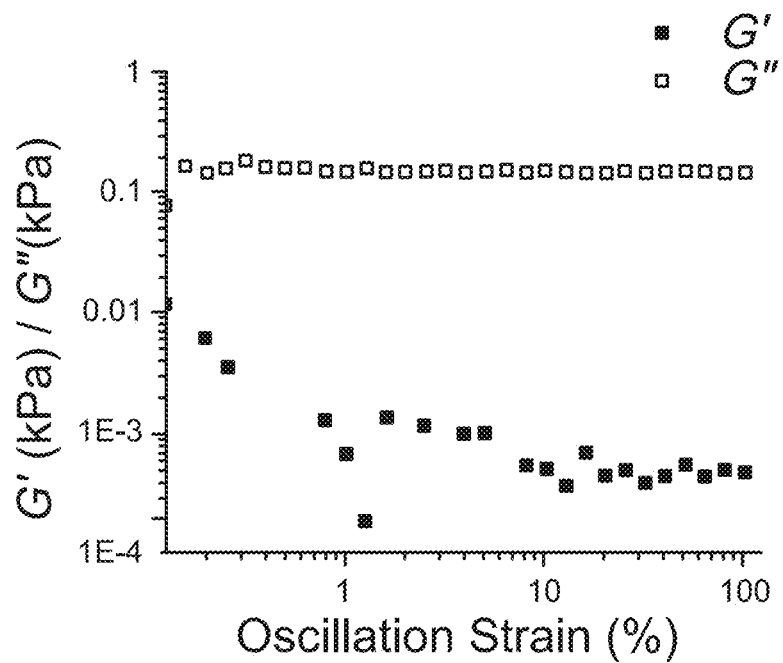
FIG. 12 is a graph showing the results of a strain sweep of $PPF_3PEG_{23}PPF_3$ 50 wt. % in DEF

3D-printing from an aqueous solution yielded distinctly different mechanical properties compared to printing from a solution of DEF-based resin. The tensile properties of water-printed $PPF_3PEG_{45}PPF_3$ material demonstrated a 10-fold increase in strain at break compared to DEF-printed $PPF_3PEG_{23}PPF_3$ (FIGS. 10-12). This extension can be attributed to the lack of DEF thereby producing a network with greater distance between crosslinks. In the case of $PPF_3PEG_{23}PPF_3$, DEF is incorporated into the final network and produces a highly cross-linked and somewhat brittle material. In contrast, the lower crosslinking density in the water-printed hydrogel affords a notable increase in conformational relaxation modes of the PEG chains allowing them to extend farther before material failure. Surprisingly, the moduli of the two conditions were similar ($PPF_3PEG_{45}PPF_3$: 9.1±0.1 kPa; $PPF_3PEG_{23}PPF_3$: 8.9±0.1 kPa) indicating the extension at break can be tuned independently of modulus.

Cell Viability.

Figure 13:
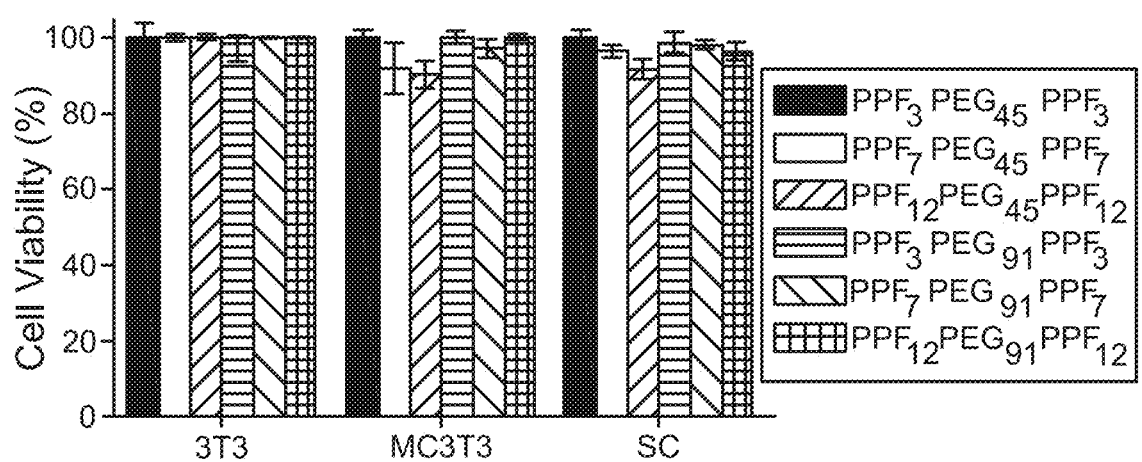
FIG. 13 is a graph showing the viability of NIH3T3, MC3T3, and Schwann cells normalized to glass slide controls on $PPF_mPEG_nPPF_m$ hydrogels. The viability was nearly quantitative.
Figure 14:
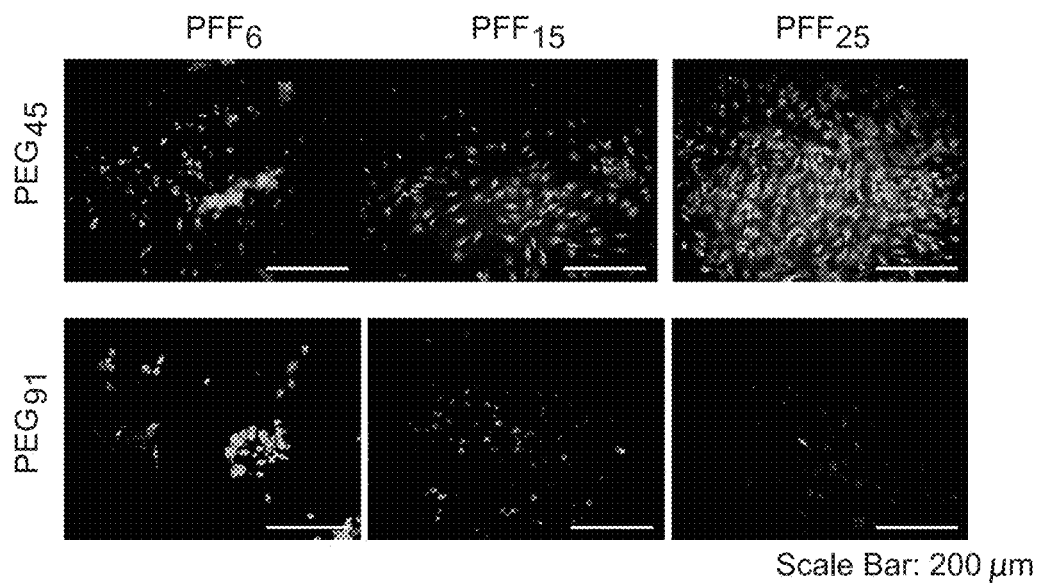
FIG. 14 is a collection of fluorescence microscopy photomicrographs of NIH3T3 cells seeded onto $PPF_6PEG_{45}PPF_6$, $PPF_{15}PEG_{45}PPF_{15}$, $PPF_{25}PEG_{45}PPF_{25}$, $PPF_6PEG_{91}PPF_6$, $PPF_{15}PEG_{91}PPF_{15}$, $PPF_{25}PEG_{91}PPF_{25}$ hydrogels.
Figure 15:
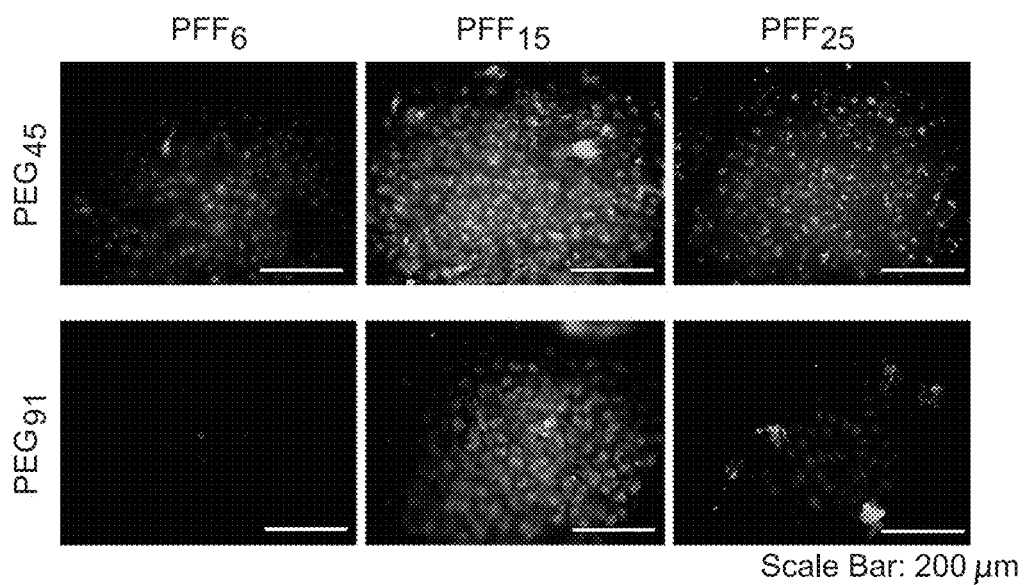
FIG. 15 is a collection of microscopy photomicrographs of MC3T3 cells seeded on $PPF_6PEG_{45}PPF_6$, $PPF_{15}PEG_{45}PPF_{15}$, $PPF_{25}PEG_{45}PPF_{25}$, $PPF_6PEG_{91}PPF_6$, $PPF_{15}PEG_{91}PPF_{15}$, $PPF_{25}PEG_{91}PPF_{25}$ hydrogels.

The potential of $PPF_mPEG_nPPF_m$ (n=45, 91) hydrogels for use in soft tissue applications, such as peripheral nerve regeneration, was evaluated using a viability assay with three different cell types. Mouse preosteoblast MC3T3-E1 cells have been frequently used for elucidating baseline cell responses for orthopaedic materials, Schwann cells are the principal glia that support neurons in the peripheral nervous system, and NIH 3T3 are a commonly used fibroblast cell line. Not surprisingly after 24 h of cell culture, the dominant green fluorescence from live cells demonstrated that $PPF_mPEG_nPPF_m$ hydrogels have high viability when each of the cell types were cultured on sterile disks of the cross-linked samples (See, FIGS. 13-15). These results indicate that the materials are nontoxic and exhibit compatibility with each of the three cell types. This was ideal as it promotes the potential for $PPF_mPEG_nPPF_m$ as a biomaterial to become translationally relevant in a number of diverse applications.

CONCLUSIONS

The availability and diversity of printable and resorbable materials will be critical to using additive manufacturing in regenerative medicine. Using a magnesium catalyst, PPF was successfully synthesized by ROCOP from the chain end of both methyl ether PEG and PEG-diol to produce a series of $PEG_nPPF_m$ diblock and $PPF_mPEG_nPPF_m$ triblock copolymers, respectively. Hydrogels printed in aqueous solution demonstrated a noticeable increase in elongation at break compared to a DEF-printed variant. Additionally, the ability to manipulate strain at break independent of modulus was demonstrated. Finally, $PPF_mPEG_nPPF_m$ (n=45, 91) hydrogels were found to be compatible with MC3T3, NIH3T3, and Schwann cell lines demonstrating the potential of these materials in tissue-engineering applications.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

Methyl ether poly(ethylene glycol) was purchased from TCI (Portland, Oreg.). All other commercial reagents and solvents were purchased from Sigma-Aldrich or Fisher Scientific and used as received unless noted otherwise. All reactions were performed under nitrogen unless noted otherwise.

Instrumentation

The $^1H$ and $^{13}C$ NMR spectra were obtained using a Varian NMRS 500 MHz spectrometer. All chemical shifts are reported in ppm (δ) and referenced to the chemical shifts of residual solvent resonances ($^1H$-NMR, $CDCl_3$ δ=7.26 ppm, DMSO-$d_6$ δ=2.49 ppm; $^{13}C$-NMR δ=77.16 ppm). Abbreviations for multiplicities are listed as following: s=singlet, d=doublet, t=triplet, br=broad singlet, m=multiplet. Diffusion-ordered NMR spectra were obtained using a Varian NMRS 500 MHz spectrometer and were processed using a Bayesian transform on MestRe Nova software. Molecular mass and molecular mass distribution ($Đ_m$) were determined by size exclusion chromatography (SEC) using a Tosoh EcoSEC HLC-8320GPC on TSKgel GMHHR-M columns in series with refractive index (RI) detection. A calibration curve from poly(styrene) standards was employed to determine molecular masses with tetrahydrofuran (THF) solvent flowing at 1.0 mL min$^{-1}$ and a sample concentration of 10.0 mg mL$^{-1}$.

Mass spectrometry was performed using a Bruker Ultra-Flex III MALDI tandem time-of-flight (TOF/TOF) mass spectrometer (Bruker Daltonics, Billerica, MA, USA) equipped with a Nd:YAG laser emitting at 355 nm. The matrix and cationization salt were DCTB (2-[(2E)-3-(4-tert-butylphenyl)-2-methylprop-2-enylidene]malononitrile) and sodium trifluoroacetate, respectively. Solutions of the matrix (20 mg/mL) and cationizing salt (10 mg·mL$^{-1}$) were prepared in $CHCl_3$, as was the polymer sample (10 mg·mL$^{-1}$). The matrix and cationizing agent solutions were mixed in 10:1 (v/v) ratio and applied to the target. After drying, a spot of the sample was applied, followed by an additional drop of the matrix/cationizing agent (sandwich method). Viscometry of the 3D printing solutions were determined using an ARES G2 Rheometer (TA Instruments, New Castle, DE) equipped with 25 mm parallel plate geometry with a gap size of 2 mm.

Example 1

Synthesis of $Mg(BHT)_2(THF)_2$ Catalyst

In a nitrogen filled, oven dried anti-bump Schlenk flask 13.22 g (0.06 mol) of 2,6-di-tert-butyl-4-methylphenol (BHT) was dried on high vacuum for 40 min. The flask was backfilled with nitrogen followed by the injection of 20 mL of anhydrous THF (0.31 mol). Once the BHT was dissolved, 30 mL of di-butyl magnesium 1.0 M in heptanes (0.03 mol) was added dropwise over the course of 1 h with the flask cooled on ice. The reaction was allowed to stir on ice for an additional 2 h before a white precipitate formed. The solvent was removed by vacuum transfer and the catalyst was dried overnight before storage in a glovebox. (17.5 g, 96% yield)

Example 2

Drying Poly(Ethylene Glycol) Starting Materials

Poly(ethylene glycol) diol and methyl ether poly(ethylene glycol) starting materials were purchased from Sigma (2 kDa and 4 kDa PEG-diol and methyl ether PEG) and TCI (1 kDa PEG-diol and methyl ether PEG) dried according to previous literature. (See, Kinard, L.; Kasper, K.; Mikos, A. Drying Poly(Ethylene Glycol). *Protoc. Exch.* 2012, the disclosure of which is incorporated herein by reference in its entirety.) In brief, 10.00 g of each PEG derivative was dissolved in anhydrous toluene and refluxed overnight with a Dean-Stark apparatus. The solution was then cannula transferred to a dry round bottom flask with 3 Å molecular sieves overnight, then transferred to another dry round bottom flask with vacuum dried molecular sieves overnight. The toluene was then removed under vacuum and the PEG was transferred into a glovebox. For scale-up polymerizations the sieve drying steps were omitted as the reaction was found to be sufficiently dried after the azeotropic distillation.

Example 3

Synthesis of Poly(Ethylene Glycol-b-Propylene Maleate) Using Methyl Ether PEG (MW 750), DP 20

Poly(ethylene glycol-b-propylene maleate) was synthesized by the copolymerization of maleic anhydride and propylene oxide to 20 degrees of polymerization (DP) initiated by methyl ether PEG (MW 750) and catalyzed by $Mg(BHT)_2(THF)_2$. as shown in Scheme 3, below.

Scheme 3

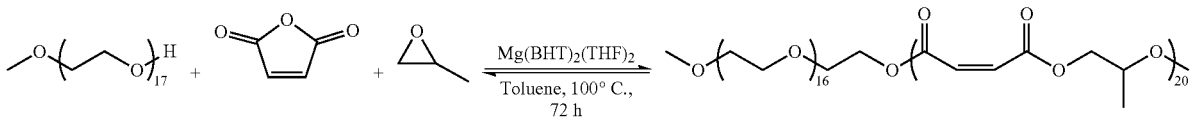

Figure 16:
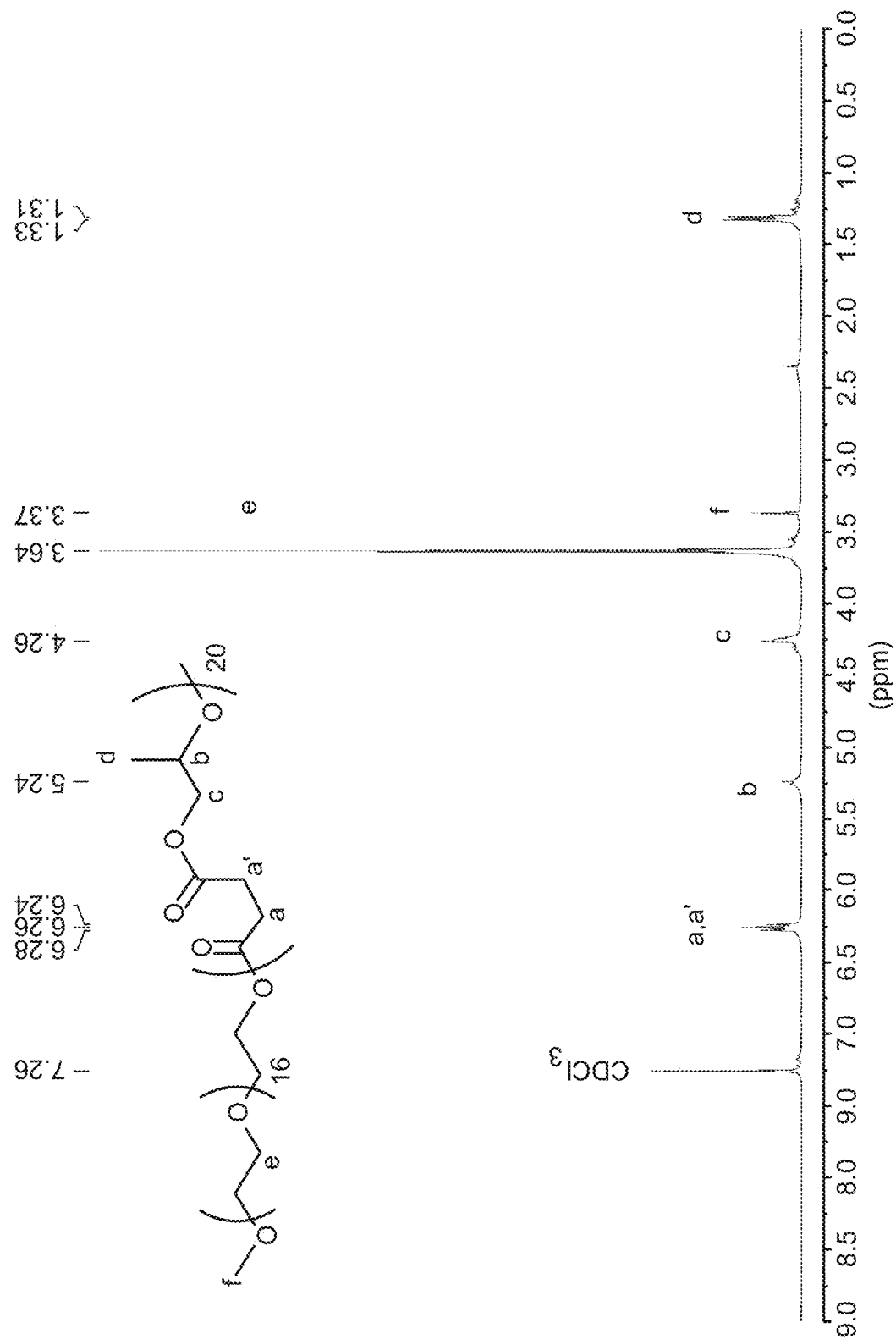
FIG. 16 is a $^1H$ NMR spectrum of methyl ether PEG MW 750 initiated poly(ethylene glycol-b-propylene maleate) using $Mg(BHT)_2(THF)_2$ as a catalyst (DP 20)(300 MHz, 303 K, $CDCl_3$).
Figure 17:
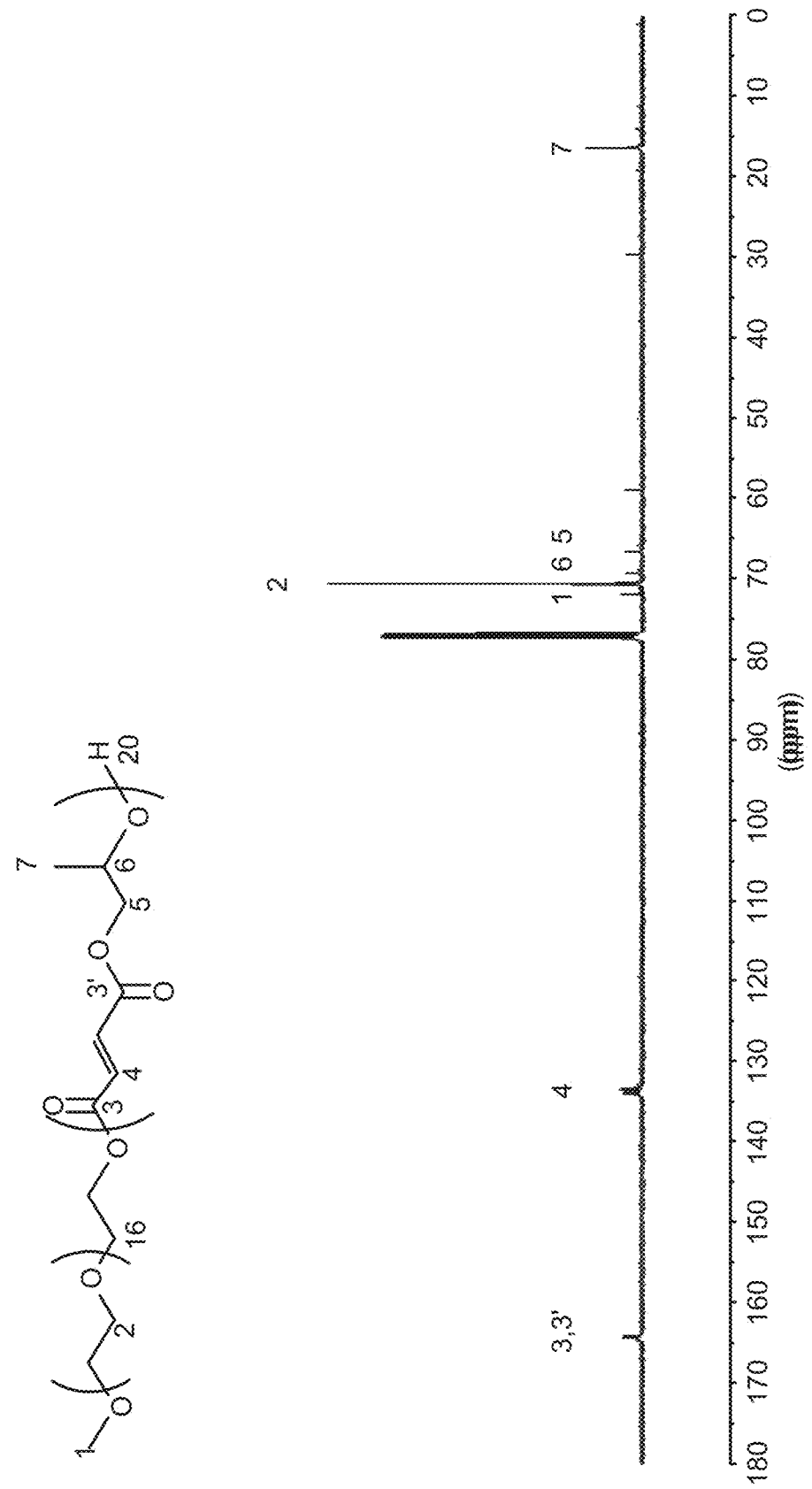
FIG. 17 is a $^{13}C$ NMR spectrum of $PEG_{17}PPF_{20}$.

Using standard Schlenk line techniques, an ampoule was filled with Mg(BHT)$_2$(THF)$_2$ (57.8 mg, 0.095 mmol), methyl ether poly(ethylene glycol) MW 750 (0.3573 g, 0.4764 mmol), propylene oxide (0.683 mL, 9.76 mmol) and maleic anhydride (0.9571 g, 9.76 mmol). The solution was dissolved into toluene to a total monomer concentration of 2 M. The ampoule was sealed and heated at 100° C. for 72 hours. The resultant polymer was recovered by precipitation in excess diethyl ether and characterized by $^1$H NMR ((300 MHz, 303 K, CDCl$_3$): δ=6.28-6.24 (t, OC(=O)CH=CHC(=O)O), 5.30-5.20 (m, CH$_2$CH(CH$_3$)O), 4.29-4.22 (m, CH$_2$CH(CH$_3$)O), 3.64 (m, OCH$_2$CH$_2$O), 3.38 (m, CH$_3$OCH$_2$CH$_2$O), and 1.33-1.31 (m, CH$_2$CH(CH$_3$)O ppm) (See FIG. 16); $^{13}$C NMR ((125 MHz, 303 K, CDCl$_3$): δ=164.35 and 164.03 (MAn*-PO, O(O)C*CH=CH), 133.90 and 133.40 (MAn*-PO, O(O)C*CH=CH), 70.54 (OCH$_2$CH$_2$O), 69.26 (MAn*-PO, CH$_2$CH(CH$_3$)O), 66.60 (MAn*-PO, CH$_2$CH(CH$_3$)O) and 16.36 (PO, CH$_2$CH(CH$_3$)O) ppm (See FIG. 17); and SEC ((THF): M$_n$=2.2 kDa, M$_w$=3.4 kDa, Đ$_M$=1.5).

Example 4

Synthesis of Poly(Ethylene Glycol-b-Propylene Maleate) Using Methyl Ether PEG (MW 750), DP 50

Poly(ethylene glycol-b-propylene maleate) was synthesized by the copolymerization of maleic anhydride and propylene oxide to 50 degrees of polymerization (DP) initiated by methyl ether PEG (MW 750) and catalyzed by Mg(BHT)$_2$(THF)$_2$.as shown in Scheme 4, below.

Scheme 4

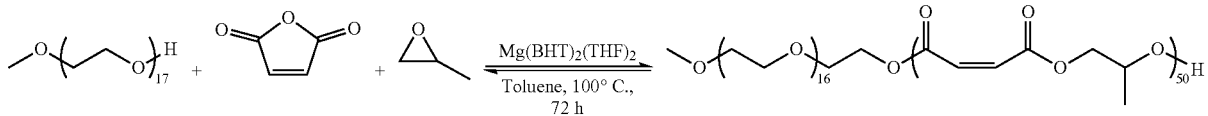

Figure 18:
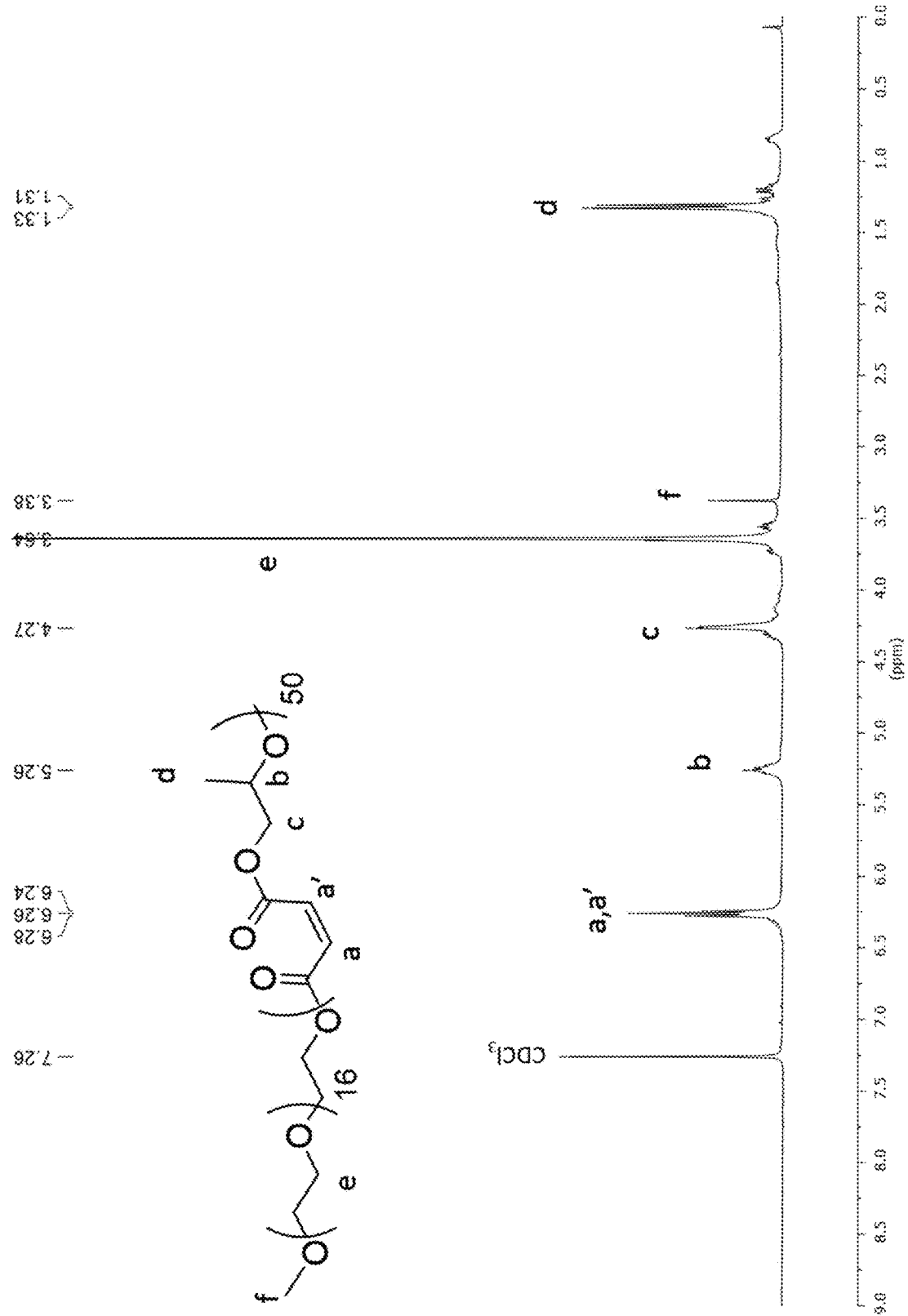
FIG. 18 is a $^1H$ NMR spectrum of methyl ether PEG MW 750 initiated poly(ethylene glycol-b-propylene maleate) using $Mg(BHT)_2(THF)_2$ as a catalyst (DP 50) (300 MHz, 303 K, $CDCl_3$).

Using standard Schlenk line techniques, an ampoule was filled with Mg(BHT)$_2$(THF)$_2$ (23.8 mg, 0.039 mmol), methyl ether poly(ethylene glycol) MW 750 (0.1471 g, 0.1961 mmol), propylene oxide (0.693 mL, 9.90 mmol) and maleic anhydride (0.9709 g, 9.90 mmol) The resultant polymer was recovered by precipitation in excess diethyl ether and characterized by $^1$H NMR ((300 MHz, 303 K, CDCl$_3$): δ=6.28-6.24 (t, OC(=O)CH=CHC(=O)O), 5.30-5.20 (m, CH$_2$CH(CH$_3$)O), 4.29-4.22 (m, CH$_2$CH(CH$_3$)O), 3.64 (m, OCH$_2$CH$_2$O), 3.38 (m, CH$_3$OCH$_2$CH$_2$O), and 1.33-1.31 (m, CH$_2$CH(CH$_3$)O ppm (See FIG. 18); $^{13}$C NMR ((125 MHz, 303 K, CDCl$_3$): δ=164.35 and 164.03 (MAn*-PO, O(O)C*CH=CH), 133.90 and 133.40 (MAn*-PO, O(O)C*CH=CH), 70.54 (OCH$_2$CH$_2$O), 69.26 (MAn*-PO, CH$_2$CH(CH$_3$)O), 66.60 (MAn*-PO, CH$_2$CH(CH$_3$)O) and 16.36 (PO, CH$_2$CH(CH$_3$)O) ppm; and SEC ((THF): M$_n$=1.7 kDa, M$_w$=2.5 kDa, Đ$_M$=1.5.)

Example 5

Synthesis of Poly(Ethylene Glycol-b-Propylene Maleate) Using PEG Diol (MW 1000), DP 20

Poly(ethylene glycol-b-propylene maleate) was synthesized by the copolymerization of maleic anhydride and propylene oxide to 20 degrees of polymerization (DP) initiated by PEG diol (MW 1000) and catalyzed by Mg(BHT)$_2$(THF)$_2$.as shown in Scheme 5, below.

Scheme 5

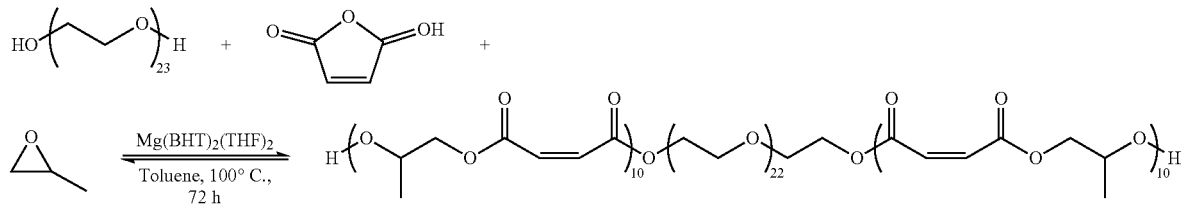

Figure 19:
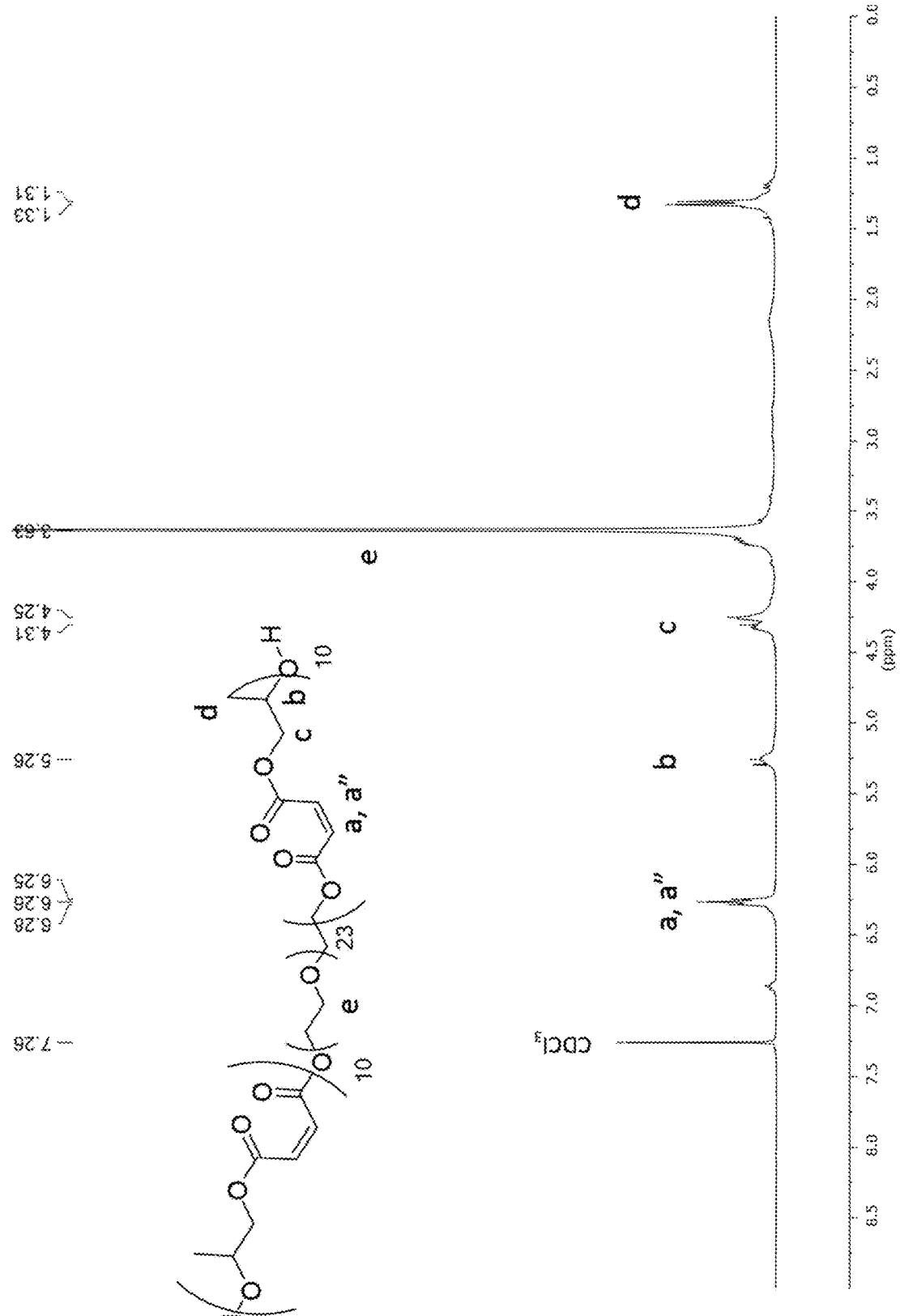
FIG. 19 is $^1H$ NMR spectrum of PEG-diol MW 1000 initiated poly(propylene maleate-b-ethylene glycol-b-propylene maleate) using $Mg(BHT)_2(THF)_2$ as a catalyst (300 MHz, 303 K, $CDCl_3$).

Using standard Schlenk line techniques, an ampoule was filled with Mg(BHT)$_2$(THF)$_2$ (0.95 g, 1.57 mmol), poly(ethylene glycol) MW 1000 (7.86 g, 7.86 mmol), propylene oxide (3.39 mL, 48.5 mmol) and maleic anhydride (4.76 g, 48.5 mmol) The resultant polymer was recovered by precipitation in excess diethyl ether and characterized by $^1$H NMR ($^1$H NMR (300 MHz, 303 K, CDCl$_3$): δ=6.28-6.24 (t, OC(=O)CH=CHC(=O)O), 5.30-5.20 (m, CH$_2$CH(CH$_3$)O), 4.29-4.21 (m, CH$_2$CH(CH$_3$)O), 3.64 (m, OCH$_2$CH$_2$O), and 1.33-1.31 (m, CH$_2$CH(CH$_3$)O ppm) (See FIG. 19); $^{13}$C NMR ((125 MHz, 303 K, CDCl$_3$): δ=164.34 and 164.03 (MAn*-PO, O(O)C*CH=CH), 133.90 and 133.40 (MAn*-PO, O(O)C*CH=CH), 70.59 (OCH$_2$CH$_2$OC(=O)CH=CH), 70.54 (OCH$_2$CH$_2$O), 69.26 (MAn*-PO, CH$_2$CH(CH$_3$)O), 66.59 (MAn*-PO, CH$_2$CH(CH$_3$)O) and 16.35 (PO, CH$_2$CH(CH$_3$)O) ppm); and SEC (THF): M$_n$=4.8 kDa, M$_w$=11.1 kDa, Đ$_M$=2.3.

Example 6

Synthesis of Poly(Propylene Maleate-b-Ethylene Glycol-b-Propylene Maleate) Using PEG Diol (MW 1000), DP 50

Poly(propylene maleate-b-ethylene glycol-b-propylene maleate) polymer (PPF$_m$PEG$_n$PPF$_m$) was synthesized by the copolymerization of maleic anhydride and propylene oxide to 50 degrees of polymerization (DP) initiated by PEG diol (MW 1000) and catalyzed by Mg(BHT)$_2$(THF)$_2$ as shown in Scheme 6, below.

and 164.03 (MAn*-PO, O(O)C*CH=CH), 133.90 and 133.40 (MAn*-PO, O(O)C*CH=CH), 70.59 (OCH$_2$CH$_2$OC(=O)CH=CH), 70.54 (OCH$_2$CH$_2$O), 69.26 (MAn*-PO, CH$_2$CH(CH$_3$)O), 66.59 (MAn*-PO, CH$_2$CH(CH$_3$)O) and 16.35 (PO, CH$_2$CH(CH$_3$)O) ppm); and SEC ((THF): M$_n$=4.0 kDa, M$_w$=6.4 kDa, Đ$_M$=1.6).

Example 7

Synthesis of Poly(Ethylene Glycol-b-Propylene Maleate) (PEG$_n$PPF$_m$)

Poly(ethylene glycol-b propylene maleate) was synthesized by ring-opening copolymerization. In an oven dried ampoule methyl ether PEG (MW 750) (0.357 g, 0.476 mmol), propylene oxide (0.683 mL, 9.76 mmol), maleic anhydride (0.957 g, 9.76 mmol), and Mg(BHT)$_2$(THF)$_2$ (57.8 mg, 0.095 mmol) were dissolved in 10 mL of toluene. The ampoule was sealed and heated at 100° C. for 72 hours. The resulting polymer was immediately quenched and recovered by precipitation in excess hexanes at 40° C. (95% conversion)$^1$H NMR (500 MHz, 303 K, CDCl$_3$): δ=6.28-6.24 (t, OC(=O)CH=CHC(=O)O), 5.30-5.20 (m, CH$_2$CH(CH$_3$)O), 4.29-4.22 (m, CH$_2$CH(CH$_3$)O), 3.64 (m, OCH$_2$CH$_2$O), 3.38 (m, CH$_3$OCH$_2$CH$_2$O), and 1.33-1.31 (m, CH$_2$CH(CH$_3$)O) ppm.

Scheme 6

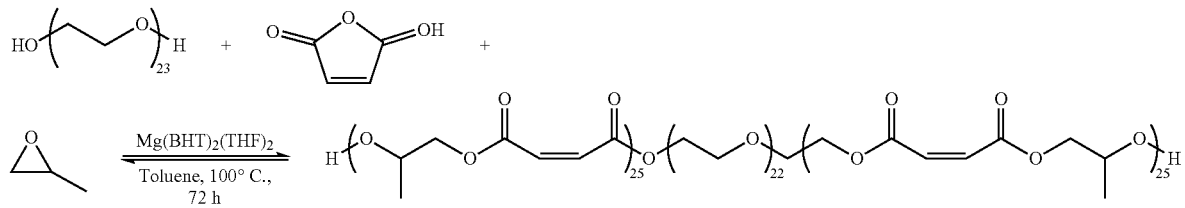

Figure 20:
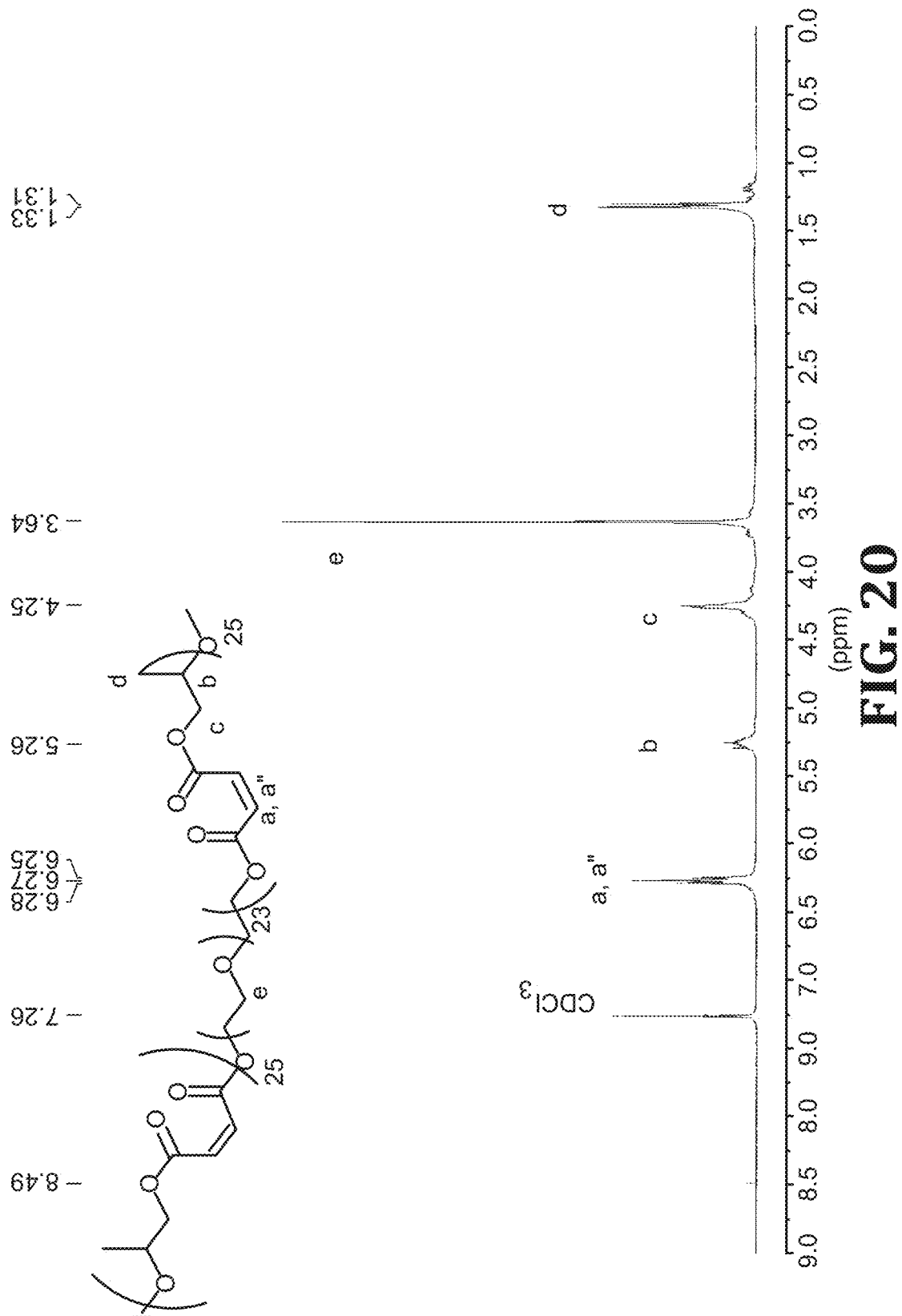
FIG. 20 is a $^1H$ NMR spectrum of PEG-diol MW 1000 initiated poly(ethylene glycol-b-propylene maleate) using $Mg(BHT)_2(THF)_2$ as a catalyst (300 MHz, 303 K, $CDCl_3$).

Using standard Schlenk line techniques, an ampoule was filled with Mg(BHT)$_2$(THF)$_2$ (23.8 mg, 0.039 mmol), poly(ethylene glycol) MW 1000 (0.1471 g, 0.1961 mmol), propylene oxide (0.693 mL, 9.90 mmol) and maleic anhydride (0.9709 g, 9.90 mmol) The resultant polymer was recovered by precipitation in excess diethyl ether and characterized by $^1$H NMR ($^1$H NMR (300 MHz, 303 K, CDCl$_3$): δ=6.28-6.24 (t, OC(=O)CH=CHC(=O)O), 5.30-5.20 (m, CH$_2$CH(CH$_3$)O), 4.29-4.21 (m, CH$_2$CH(CH$_3$)O), 3.64 (m, OCH$_2$CH$_2$O), and 1.33-1.31 (m, CH$_2$CH(CH$_3$)O ppm) (See FIG. 20); $^{13}$C NMR ((125 MHz, 303 K, CDCl$_3$): δ=164.34

Example 8

Synthesis of Poly(Propylene Maleate-b-Ethylene Glycol-b-Propylene Maleate) (PPM$_m$PEG$_n$PPM$_m$)

PEG-diol (MW 1000) (0.911 g, 0.091 mmol), propylene oxide (0.668 mL, 9.54 mmol), maleic anhydride (0.935 g, 9.54 mmol), and Mg(BHT)$_2$(THF)$_2$ (110.6 mg, 0.182 mmol) were dissolved in 10 mL of toluene in an oven dried ampoule. The ampoule was sealed and heated at 100° C. for 72 hours. The resultant polymer was recovered by precipitation in excess hexanes at 40° C. and washed with phosphate buffer solution to remove excess starting material before drying on high vacuum. (97% conversion)$^1$H NMR (500 MHz, 303 K, CDCl$_3$): δ=6.28-6.24 (t, OC(=O)CH=CHC(=O)O), 5.30-5.20 (m, CH$_2$CH(CH$_3$)O), 4.29-4.21 (m, CH$_2$CH(CH$_3$)O), 3.64 (m, OCH$_2$CH$_2$O), and 1.33-1.31 (m, CH$_2$CH(CH$_3$)O) ppm.

Example 9

Isomerization of Methyl Ether Poly(Ethylene Glycol-b-Propylene Maleate) DP 50

The methyl ether poly(ethylene glycol-b-propylene maleate) (DP 50) of Example 4 was isomerized to form poly(ethylene glycol-b-propylene fumarate) using diethylamine as shown in Scheme 7 below.

Scheme 7

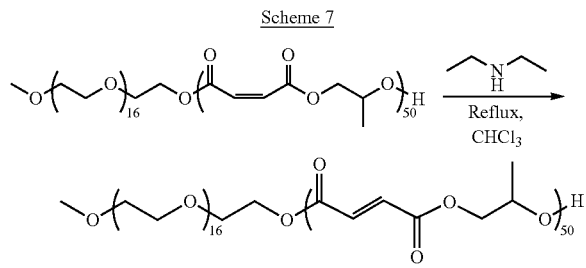

Figure 21:
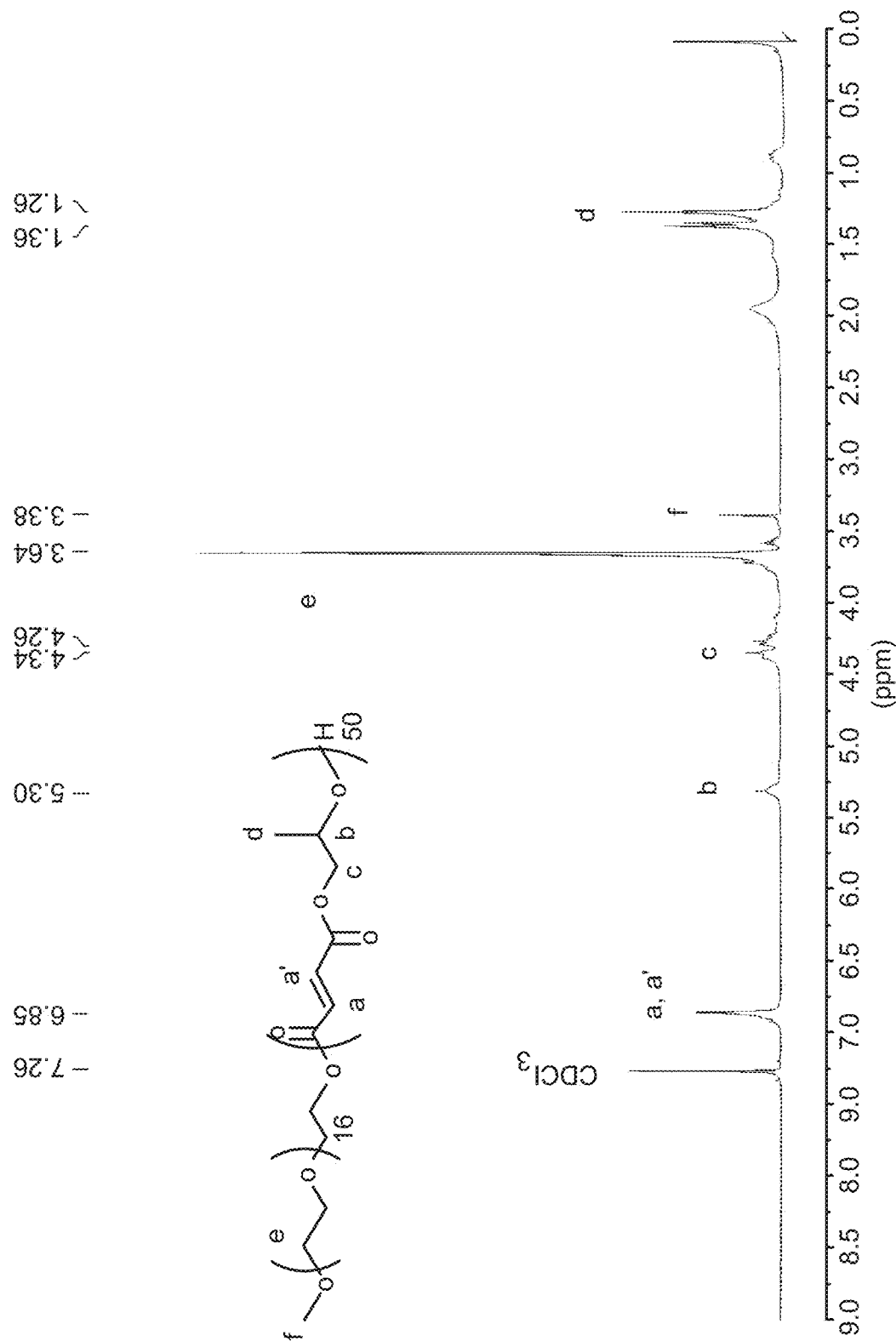
FIG. 21 is a $^1H$ NMR spectrum of methyl ether PEG MW 750 initiated poly(ethylene glycol-b-propylene maleate) using $Mg(BHT)_2(THF)_2$ as a catalyst (DP 50) (300 MHz, 303 K, $CDCl_3$).
Figure 22:
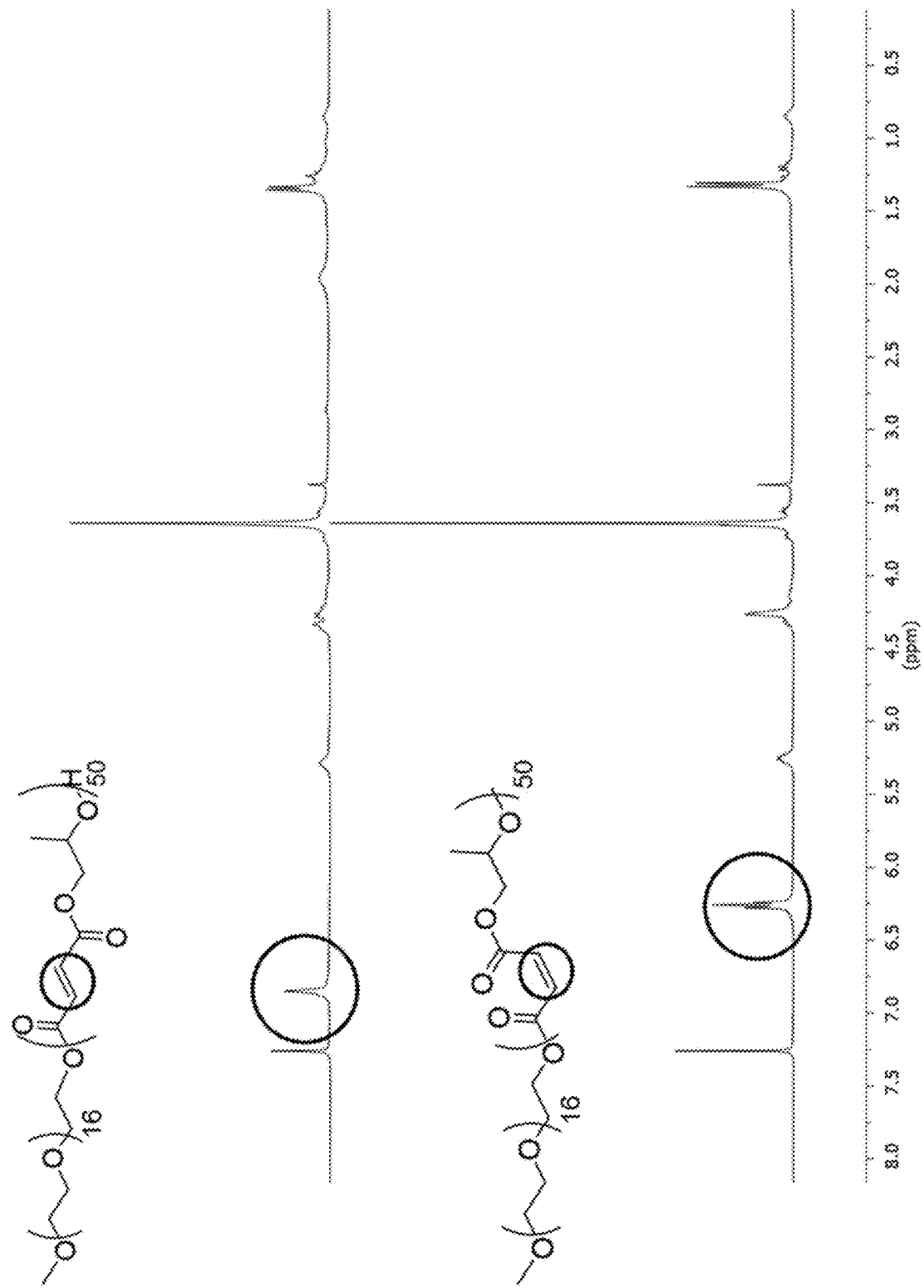
FIG. 22 is a $^1H$ NMR spectra comparison of poly(ethylene glycol-b-propylene fumarate) (top) against the precursor poly(ethylene glycol-b-propylene maleate) (bottom) (300 MHz, 303 K, $CDCl_3$).
Figure 23:
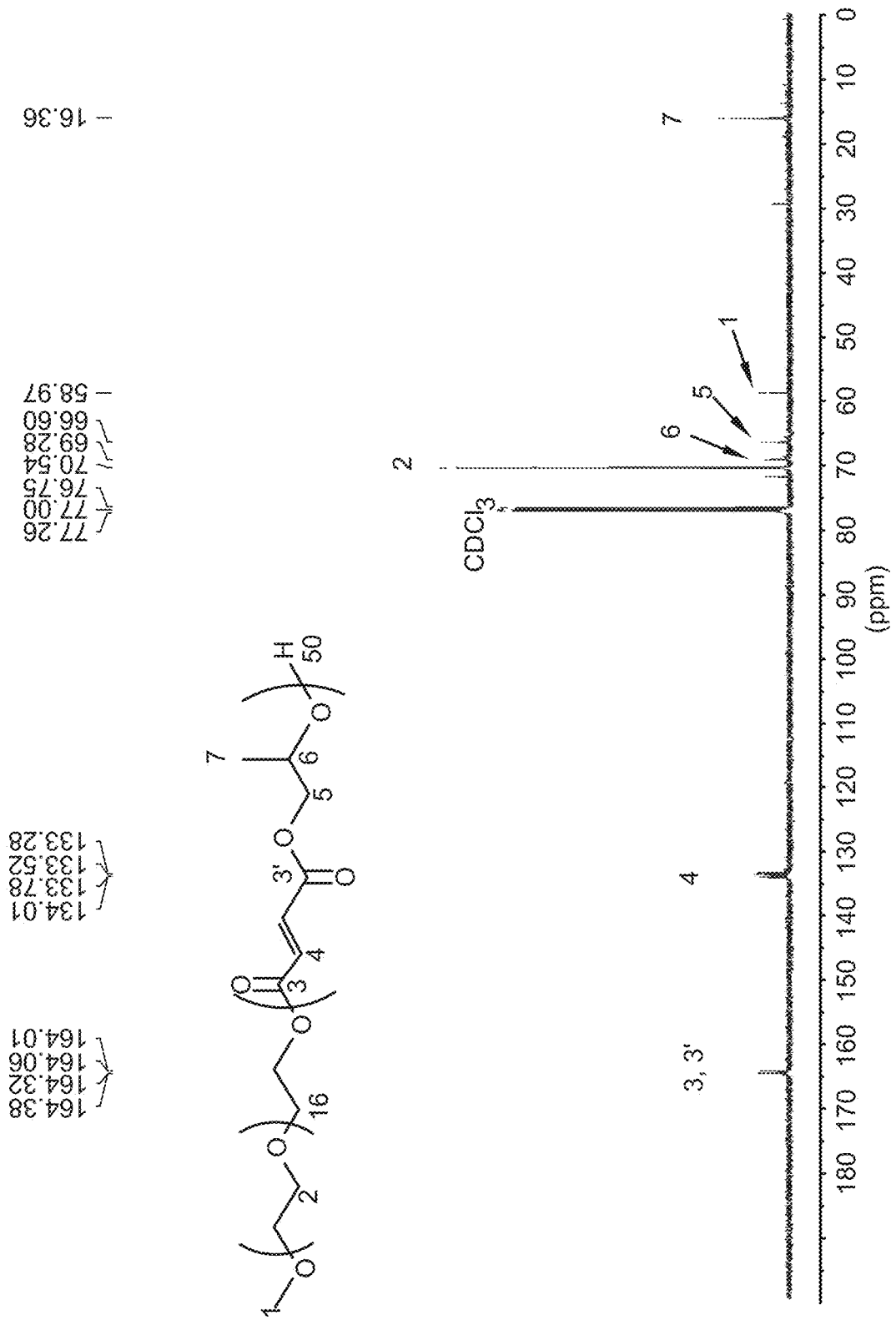
FIG. 23 is a $^{13}C$ NMR spectrum of methyl ether PEG 750 MW initiated poly(ethylene glycol-b-propylene fumarate) using $Mg(BHT)_2(THF)_2$ as a catalyst (125 MHz, 303 K, $CDCl_3$).
Figure 24:
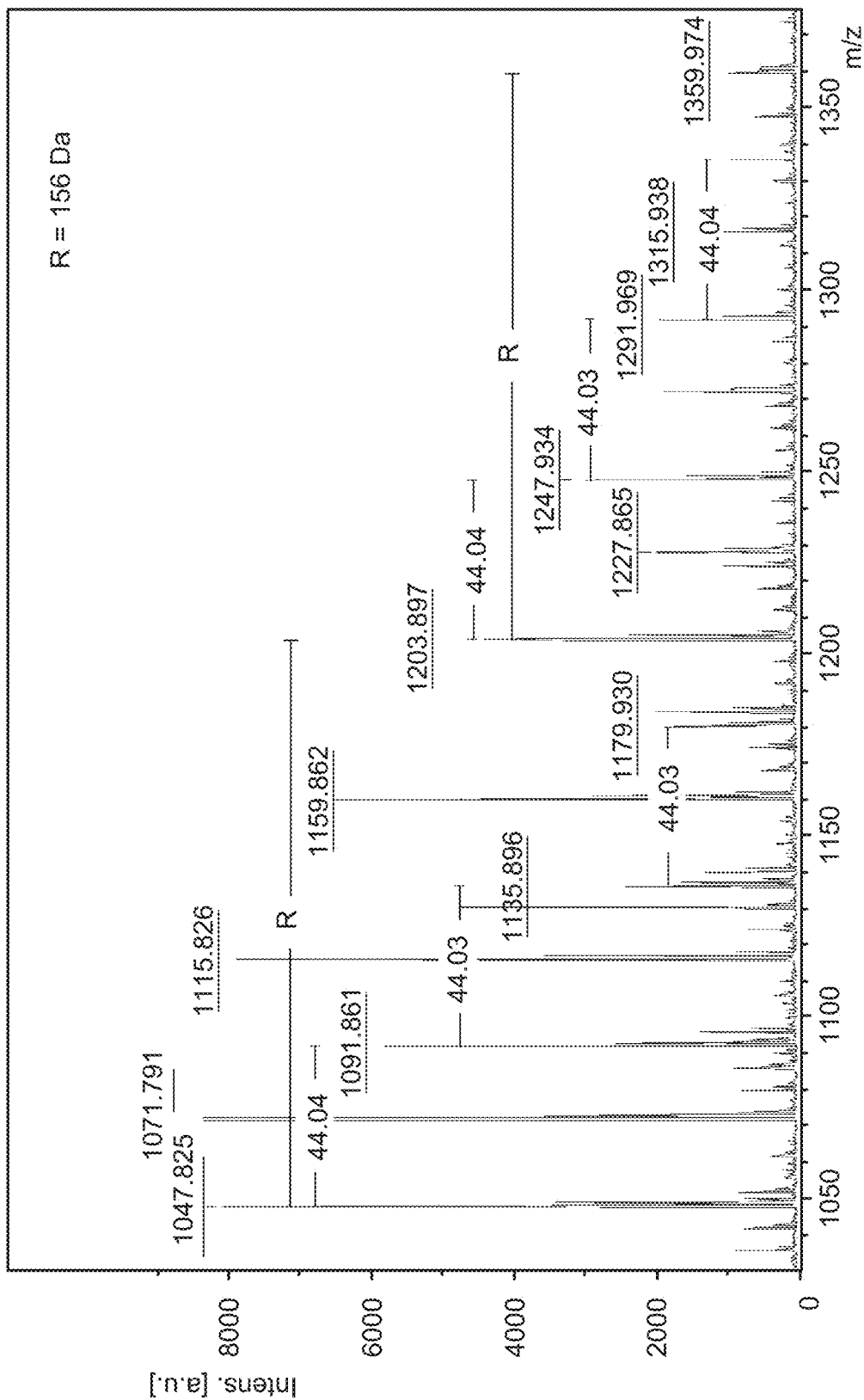
FIG. 24 is a MALDI-ToF MS plot of poly(propylene fumarate) initiated by MW 750 methyl ether poly(ethylene glycol).

The methyl ether poly(ethylene glycol-b-propylene maleate) (1.00 g, 10 mol. eq. olefin) was dissolved into chloroform (50 mL). Diethylamine (0.151 mL, 0.15 mol. eq. olefin) was added to the solution and refluxed for 24 h under a nitrogen atmosphere. After cooling to room temperature, the organic solution was washed with phosphate buffer solution (150 mL, pH=6) and the polymer was recovered through precipitation from hexanes and characterized using $^1$H NMR ((300 MHz, 303 K, CDCl$_3$): δ=6.88-6.82 (m, OC(=O)CH=CH(=O)O), 5.35-5.25 (m, CH$_2$CH(CH$_3$)O), 4.43-4.18 (m, CH$_2$CH(CH$_3$)O), 3.64 (m, OCH$_2$CH$_2$O), 3.38 (s, H$_3$COCH$_2$CH$_2$O) and 1.36-1.34 (m, CH$_2$CH(CH$_3$)O) ppm) (See FIGS. 21, 22), $^{13}$C NMR (See FIG. 23) and MALDI-ToF MS (See FIG. 24)

Example 10

Isomerization of Poly(Ethylene Glycol-b-Propylene Maleate)

Figure 25A:
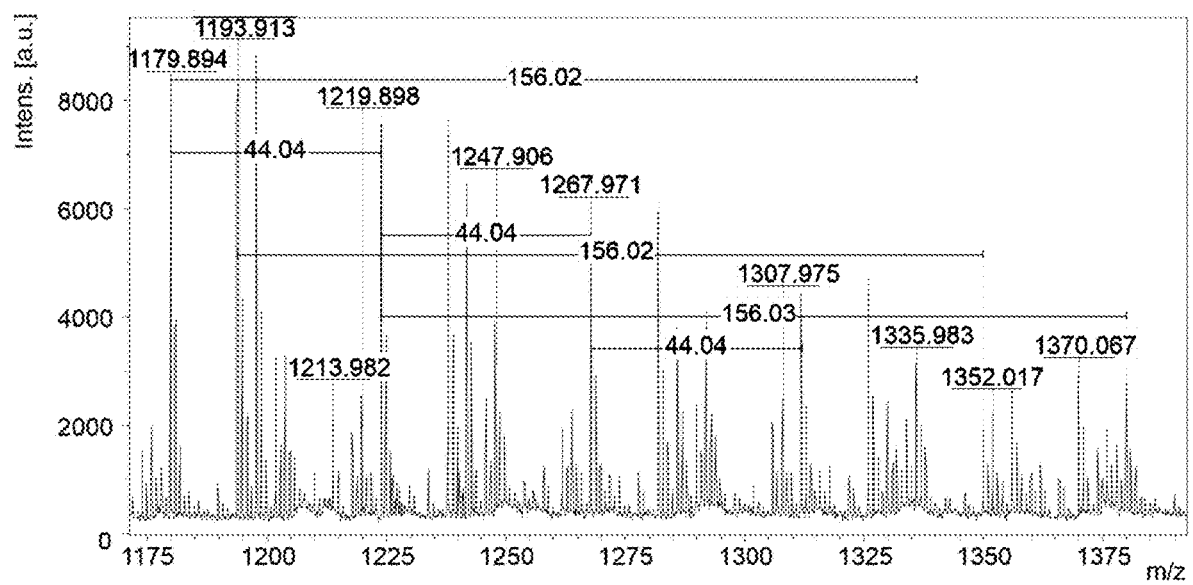
FIG. 25A-B are spectra showing the results of MALDI-TOF mass spectrometry (FIG. 25A) and size exclusion chromatography (FIG. 25B) used to confirm the synthesis of diblock copolymers.
Figure 25B:
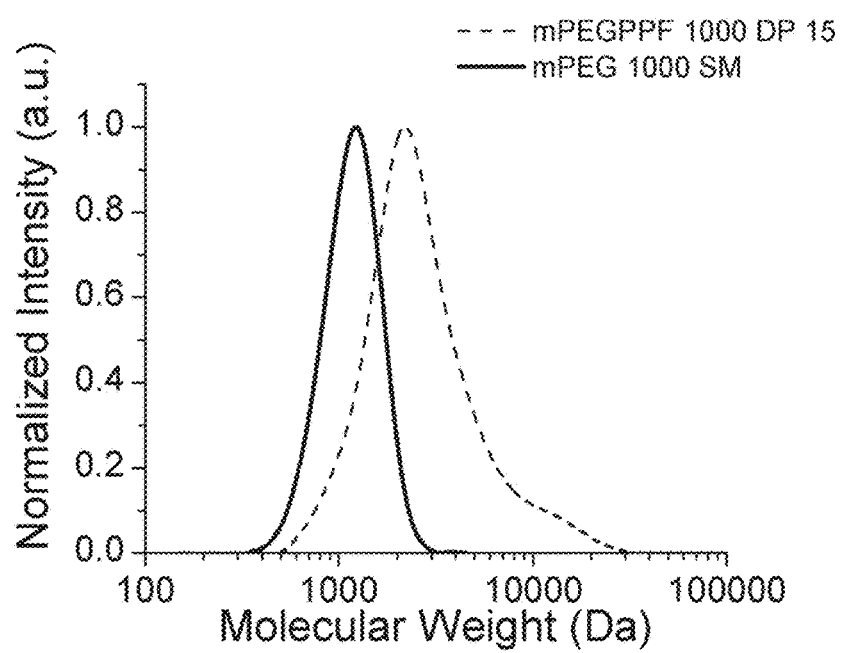

Poly(ethylene glycol-b-propylene fumarate) (1 g, 10 mol. eq. olefin) was dissolved into chloroform (50 mL). Diethylamine (0.151 mL, 0.15 mol. eq. olefin) was added to the solution and refluxed for 24 h under a nitrogen atmosphere. After cooling to room temperature, the organic solution was washed with phosphate buffer solution (150 mL, pH=6) and the polymer was recovered through precipitation from hexanes. $^1$H NMR (500 MHz, 303 K, CDCl$_3$): δ=6.88-6.82 (m, OC(=O)CH=CH(=O)O), 5.35-5.25 (m, CH$_2$CH(CH$_3$)O), 4.43-4.18 (m, CH$_2$CH(CH$_3$)O), 3.64 (m, OCH$_2$CH$_2$O), 3.38 (s, H$_3$COCH$_2$CH$_2$O) and 1.36-1.34 (m, CH$_2$CH(CH$_3$)O) ppm. MALDI-TOF mass spectrometry (FIG. 25A) and size exclusion chromatography (FIG. 25B) were used to confirm the synthesis of triblock copolymers.

Example 11

Isomerization of Poly(Propylene Maleate-b-Ethylene Glycol-b-Propylene Maleate)

Figure 26A:
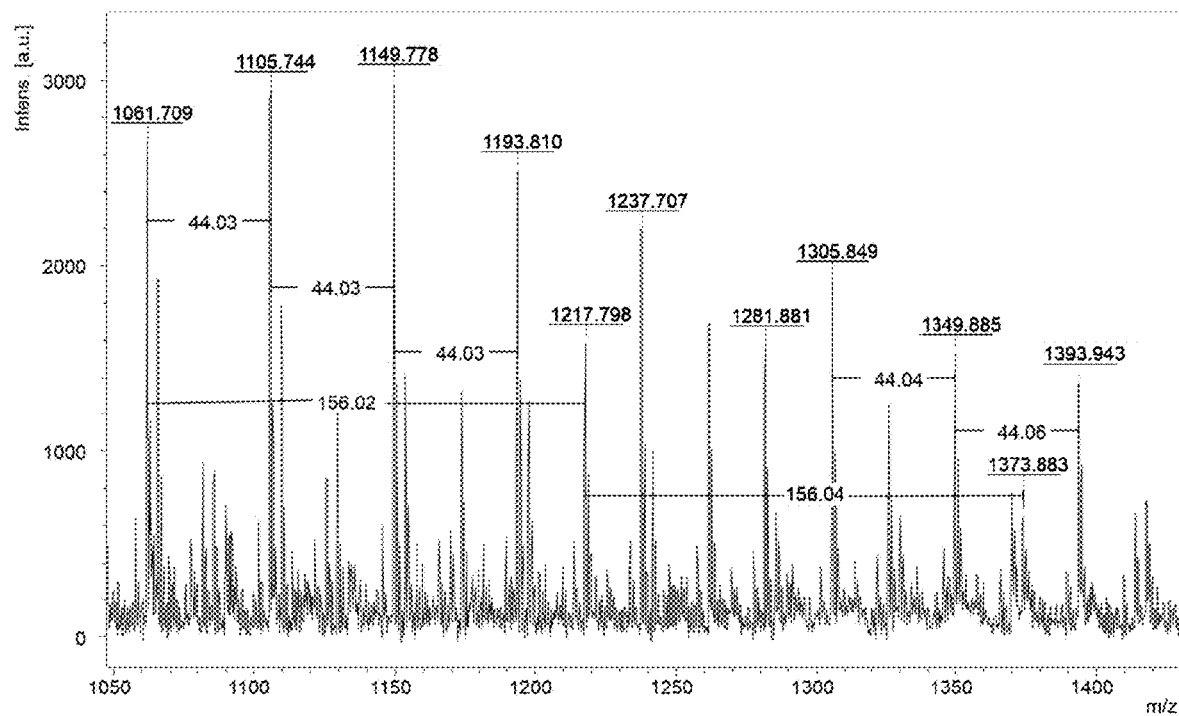
FIG. 26A-B are spectra showing the results of MALDI-TOF mass spectrometry (FIG. 26A) and size exclusion chromatography (FIG. 26B) used to confirm the synthesis of triblock copolymers.
Figure 26B:
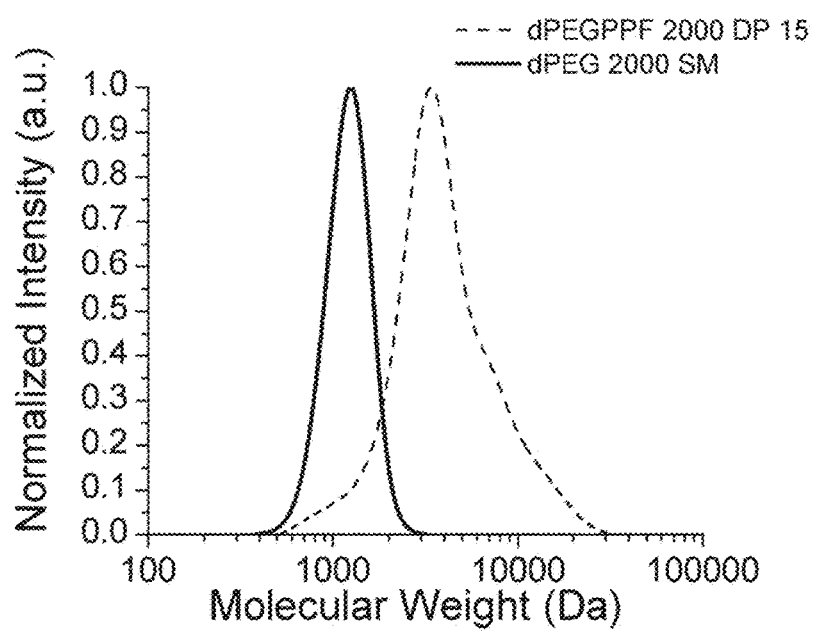

Poly(polypropylene maleate-b-ethylene glycol-b-propylene maleate) (1.00 g, 10 mol. eq. olefin) was dissolved into chloroform (50 mL). Diethylamine (0.151 mL, 0.15 mol. eq. olefin) was added to the solution and refluxed for 24 h under a nitrogen atmosphere. After cooling to room temperature, the organic solution was washed with phosphate buffer solution (150 mL, pH=6) and the polymer was recovered through precipitation from hexanes. $^1$H NMR (500 MHz, 303 K, CDCl$_3$): δ=6.88-6.82 (m, OC(=O)CH=CH(=O)O), 5.30-5.20 (m, CH$_2$CH(CH$_3$)O), 4.29-4.21 (m, CH$_2$CH(CH$_3$)O), 3.64 (m, OCH$_2$CH$_2$O), and 1.33-0.31 (m, CH$_2$CH(CH$_3$)O) ppm. MALDI-TOF mass spectrometry (FIG. 26A) and size exclusion chromatography (FIG. 26B) were used to confirm the synthesis of triblock copolymers.

Example 12

Isomerization of Poly(Propylene Maleate-b-Ethylene Glycol-b-Propylene Maleate)

Figure 27:
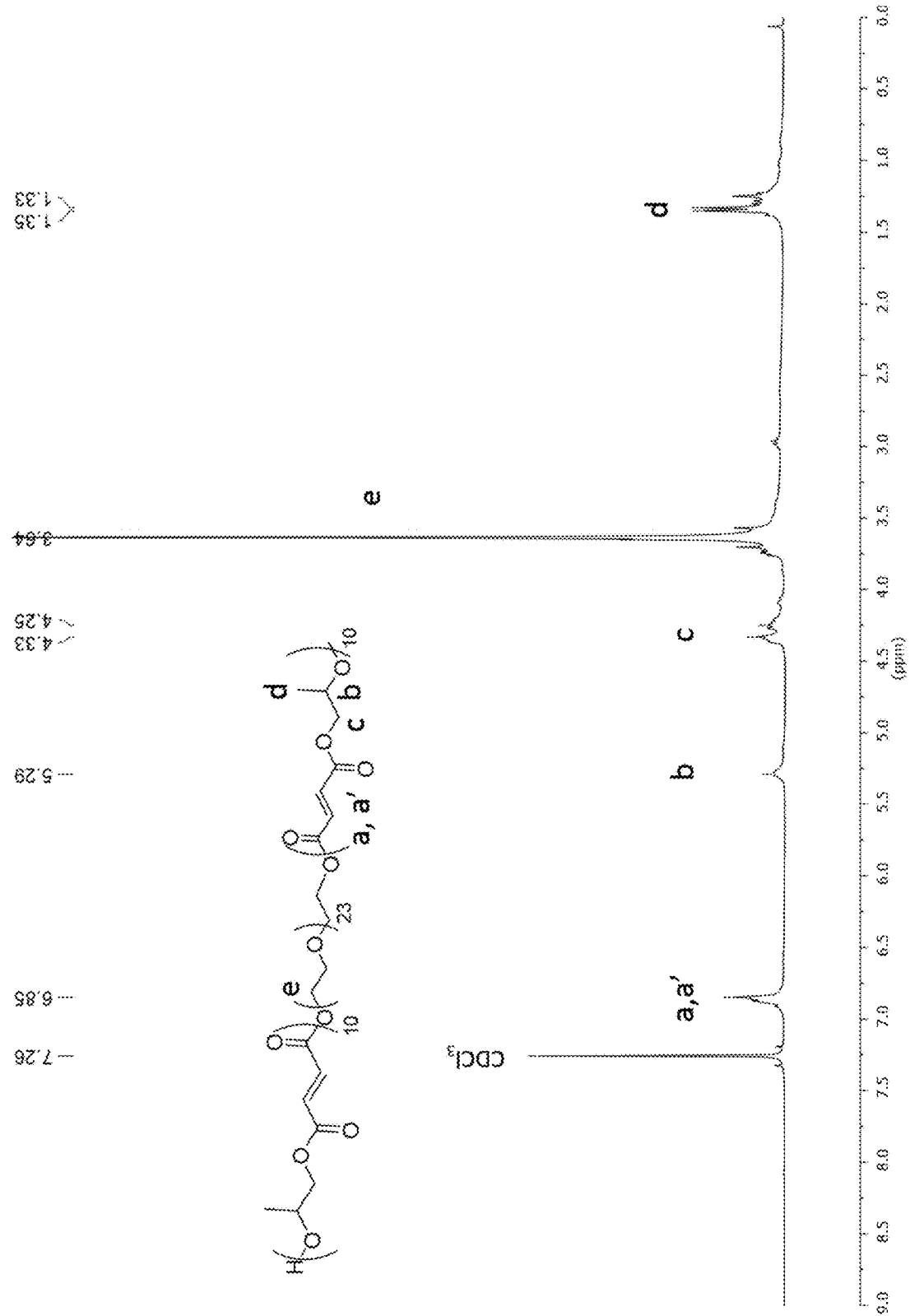
FIG. 27 is $^1H$ NMR spectrum of PEG-diol MW 1000 initiated poly(propylene fumarate-b-ethylene glycol-b-propylene fumarate) using $Mg(BHT)_2(THF)_2$ as a catalyst (300 MHz, 303 K, $CDCl_3$).
Figure 28:
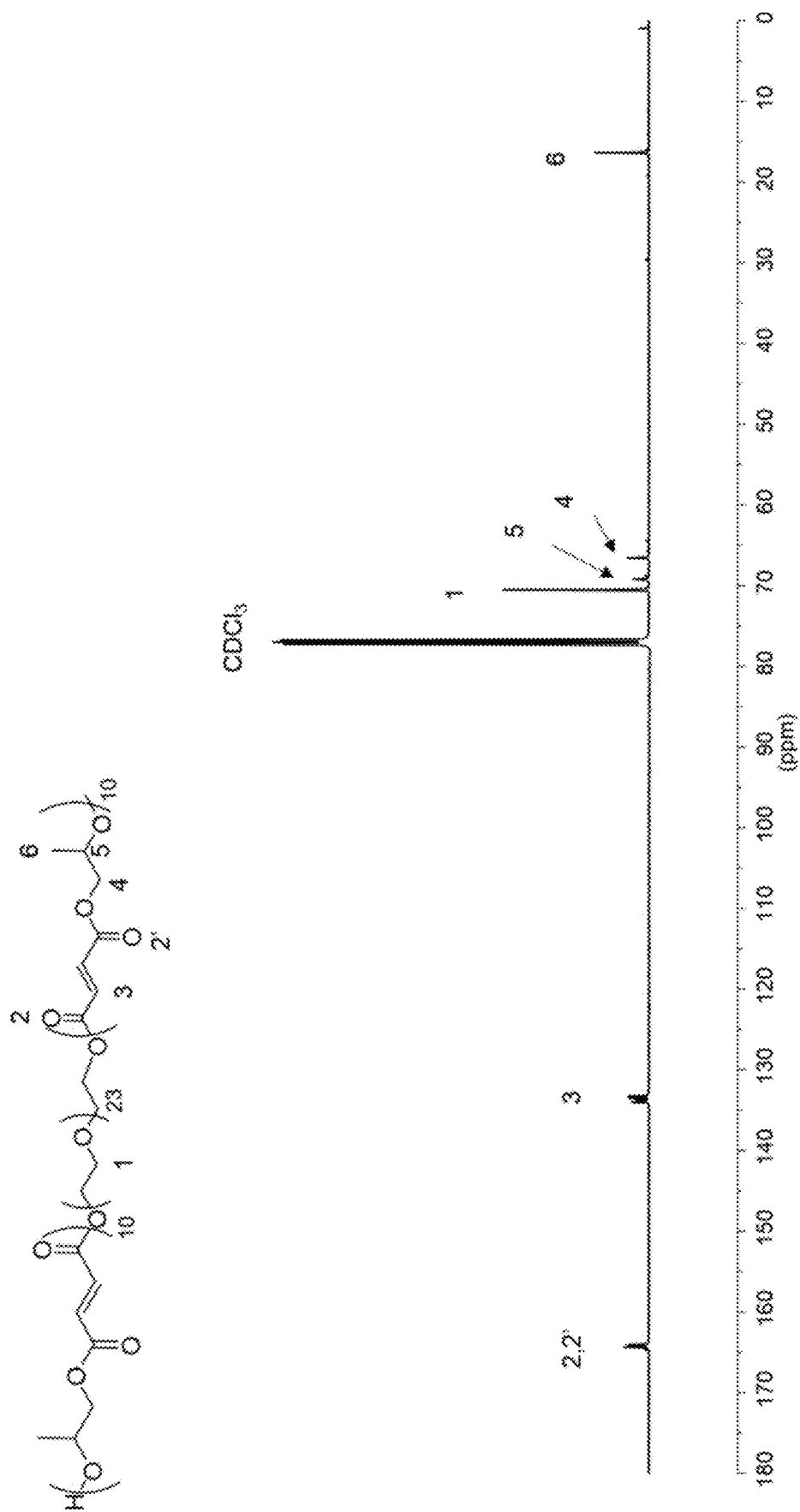
FIG. 28 is a $^{13}C$ NMR of $PPF_{10}PEG_{23}PPF_{10}$.
Figure 29:
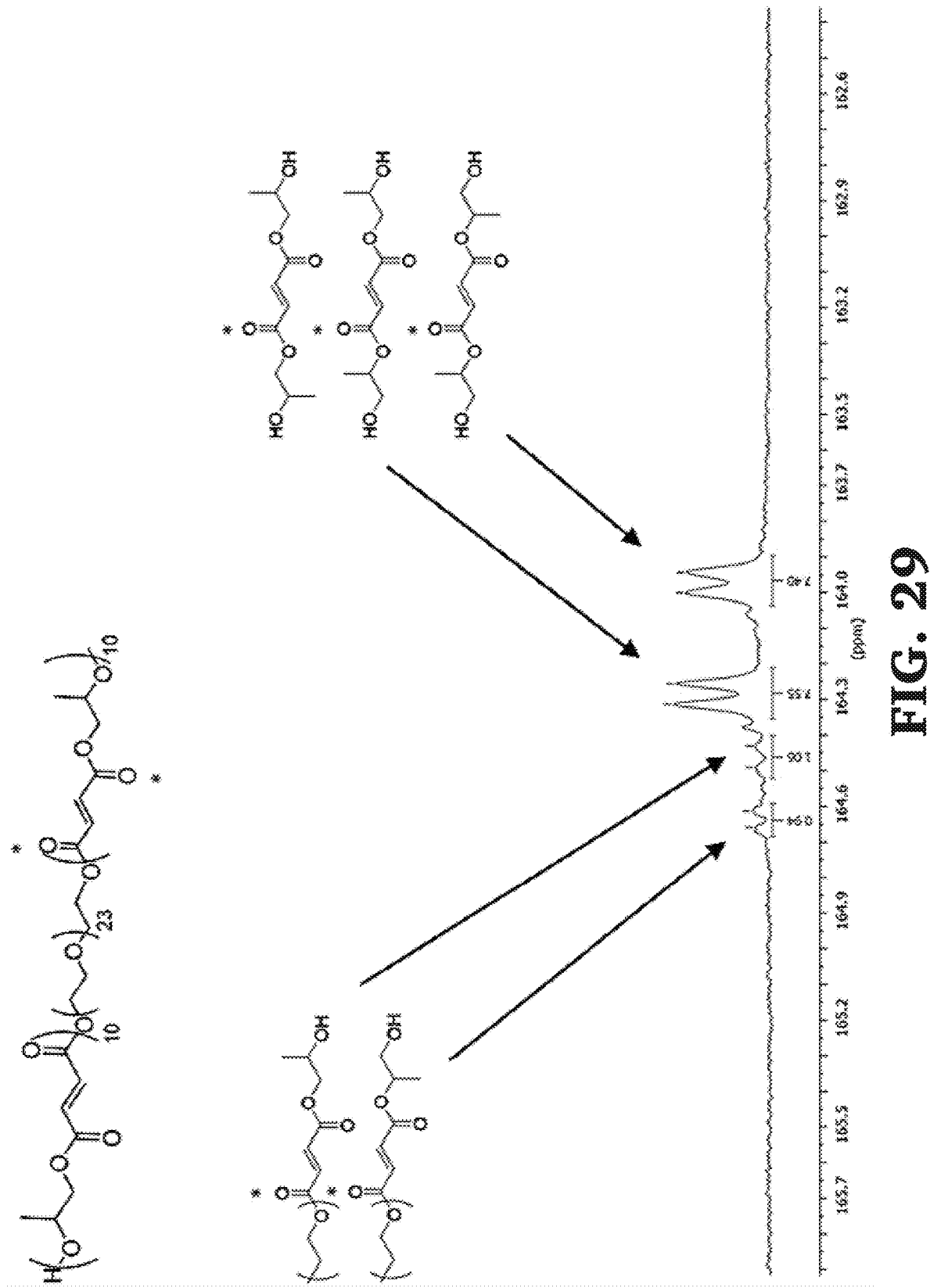
FIG. 29 is a quantitative $^{13}C$ NMR spectrum of PEG-diol MW 1000 initiated poly(ethylene glycol-b-propylene fumarate) demonstrating block-like character by the low integrations for peaks referencing PEG repeat units adjacent to PPF repeat units (125 MHz, 303 K, $CDCl_3$).

The poly(polypropylene maleate-b-ethylene glycol-b-propylene maleate) polymer formed in Example 5, above (PPM$_{10}$PEG$_{23}$PPM$_{10}$) was isomerized using the method set forth above in Example 11. $^1$H NMR, $^{13}$C NMR, and quantitative $^{13}$C NMR spectra of the resulting PPF$_{10}$PEG$_{23}$PPF$_{10}$ polymer are at FIGS. 27-29.

Example 13

Synthesis of Lithium Phenyl-2,4,6-Trimethylbenzoylphosphinate (LAP)

Figure 30:
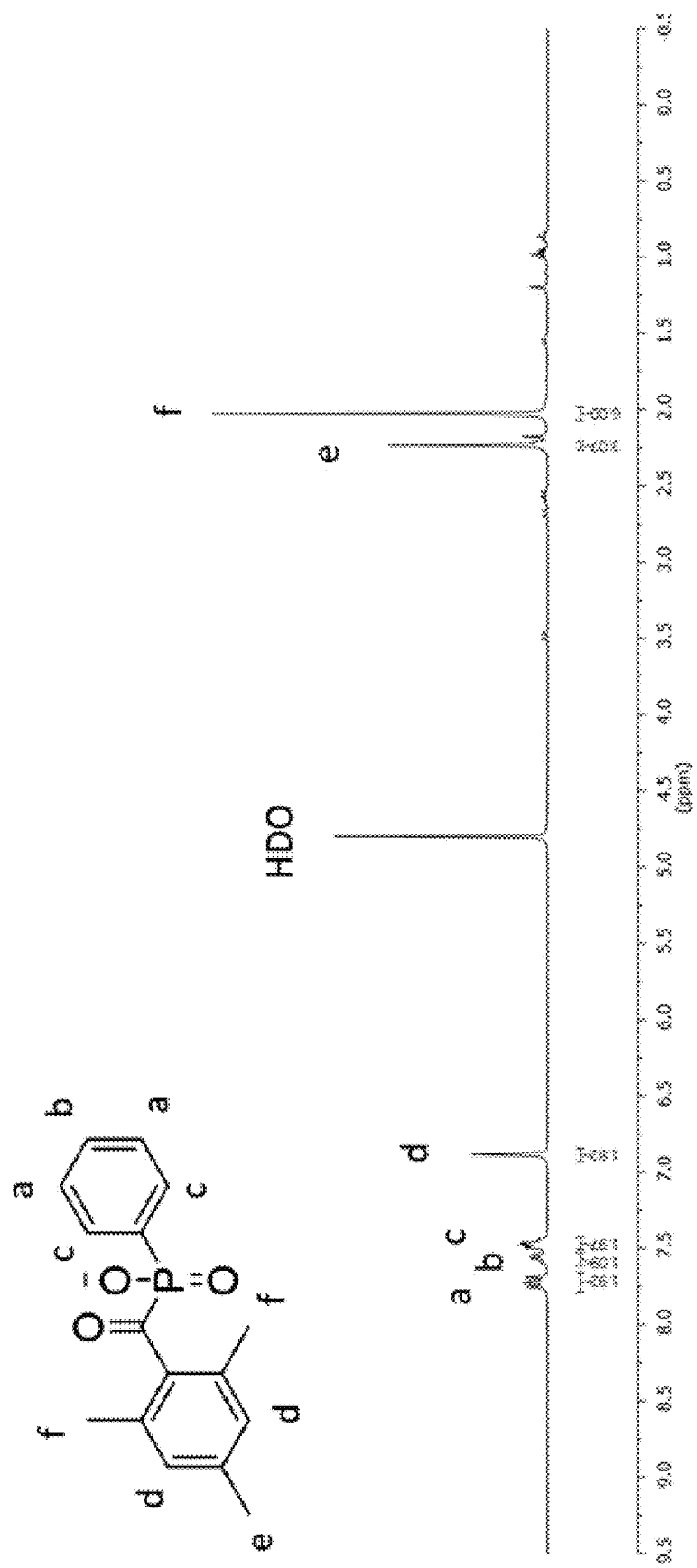
FIG. 30 is a $^1H$ NMR spectrum of LAP photoinitiator.

In a nitrogen filled two-necked 500 mL round bottom flask, 10.69 g of 2,4,6-trimethylbenzoylchloride (0.06 mol, 1 eq.) were added to 10 g of dimethylphenylphosphonite (0.06 mol, 1 eq.). The reaction was allowed to stir at room temperature for 18 h before 20.13 g of LiBr (0.23 mol, 4 eq.) in 125 mL of 2-butanone were added. The reaction was then heated to 50° C. for 10 min during which a white precipitate formed. The reaction was then cooled for 3 h until it reached room temperature. The white product was washed in a Buchner funnel with 300 mL of 2-butanone before drying on vacuum overnight. (13.22 g, 77% yield). $^1$H NMR (500 MHz, 303 K, D$_2$O): δ=7.82-7.78 (tot, 2H), 7.67-7.64 (tot, 1H), 7.57-7.54 (m, 2H), 6.98 (s, 2H), 2.33 (s, 3H), and 2.11 (s, 6H) ppm. (See FIG. 30)

Example 14

Hydrogel Fabrication

Hydrogels were prepared at 20-25 wt. %, depending on their individual viscosities with an initiator (LAP) molar ratio of 1:5 of double bond in the polymer backbone. Once the solutions were dissolved, they were placed in a UV oven (EnvisionTec, Dearborn, MI, 70 W, 55 Hz, λ$_{max}$=400 nm) for 10 min to cure.

Example 15

Viscometry

Complex viscosity measurements of polymer solutions in both water and DEF were performed on an ARES G2

Rheometer (TA Instruments, New Castle, DE) equipped with 25 mm aluminum parallel plates. A sweep from 0.01-100% strain was employed to determine the linear viscoelastic (LVE) regime, and frequency sweeps were taken at appropriate strains to measure the viscosity. Reported values are the average of the frequency sweeps done in triplicate for each polymer. (See FIGS. 11, 12)

Example 16

3D Printing of $PPF_mPEG_nPPF_m$ $PPF_mPEG_{23}PPF_m$ was printed on an EnvisionTec Micro+ Advantage 3D printer using a 405 nm UV light projector. Resin formulations were prepared as follows: for printing with diethyl fumarate (DEF), the polymer was dissolved at 50 wt. % in DEF with an additional 3 wt. % BAPO, 0.7 wt. % IRGACURE™ 784, and 0.4 wt. % oxybenzone. For printing from an aqueous solution, $PPF_mPEG_nPPF_m$ (n=45, 91) polymers were dissolved from 20-25 wt. % in water depending on their complex viscosities with 1:5 molar ratio of LAP photoinitiator to double bond in the polymer (determined by Mn by $^1$H NMR).

Example 17

Gel Swelling

Hydrogels were swollen in DI water for 48 h, weighed, and then freeze dried for 72 h to remove all excess water. The swelling ratio Q is defined by $$Q = \frac{(M_s - M_d)}{M_d}$$

where $M_s$ is the mass of the equilibrium swollen hydrogel and $M_d$ is the mass of the completely dried hydrogel. See, FIG. 9.

Example 18

Sterilization

Hydrogel samples (8 mm) were washed with an ethanol solution (21% acetone, 49% ethanol, and 30% v/v distilled water) twice for 25 minutes each under sonication and soaked with PBS to rinse off residual solvent. Samples were then autoclaved in PBS on liquid cycle for sterilization. Samples were carefully transferred to a 24-well plate and 1 mL of media was added to each well.

Example 19

Cell Culture

MC3T3-E1 preosteoblast cells were expanded and cultured in α-MEM medium (GIBCO, Life Technologies, Grand Island, NY) supplemented with 10% fetal bovine serum (FBS) (Invitrogen, Grand Island, NY), 100 units·mL$^{-1}$ penicillin (Invitrogen, Grand Island, NY), and 100 units·mL$^{-1}$ of streptomycin (Invitrogen, Grand Island, NY). NIH 3T3 mouse fibroblast cells were cultured in a DMEM medium supplemented with 10% FBS and 100 units·mL$^{-1}$ each penicillin and streptomycin. Primary Schwann cell (SC) line isolated from adult rat sciatic nerves was utilized for the studies as previously described in Fairbanks, B. D.; Schwartz, M. P.; Bowman, C. N.; Anseth, K. S. Biomaterials Photoinitiated Polymerization of PEG-Diacrylate with Lithium Phenyl-2, 4, 6-Trimethylbenzoylphosphinate: Polymerization Rate and Cytocompatibility. *Biomaterials* 2009, 30 (35), 6702-6707 SC, the disclosures of which are incorporated herein by reference in their entirety, were expanded and culture in a DMEM medium supplemented with 10% FBS, 100 units·mL$^{-1}$ each penicillin and streptomycin, forskolin (5 µM, Sigma Aldrich), N2 supplement (1% vol/vol, Sigma Aldrich), and bovine pituitary extract (20 µg·mL$^{-1}$, Sigma Aldrich). Cells were kept at 37° C. in a 5% $CO_2$ humidified atmosphere. For cell seeding, cells were rinsed with DPBS and detached from the flasks using a 0.05% trypsin/ethylenediaminetetraacetic acid tetrasodium salt (EDTA) solution for 5 min at 37° C. in a 5% $CO_2$ humidified atmosphere. Detached cells were collected into a conical tube containing equal part of media. Cells were centrifuged into pellets at 400 g for 6 min and media/trypsin solution was aspirated. Cells were resuspended in fresh media, counted using a hemocytometer and seeded on the hydrogels at a density of 5×10$^5$ cells/sample.

Example 20

Viability Assay

Viability was evaluated after 1 day of cell culture using a live/dead viability/cytotoxicity kit for mammalian cells (Life Technologies). The staining solution was prepared by dissolving calcein-AM (4 mM, 54) and ethidium homodimer (5 µL) in 10 mL of DPBS in the dark. Samples were rinsed with DPBS once and incubated in 1 mL of staining solution at 37° C., 5% $CO_2$ for 10 min. Photomicrographs were taken on a Keyence BZ-X700 microscope with filters for Texas Red and GFP at 20× magnification. Photomicrographs were analyzed for live/dead counts using ImageJ (NIH) software with a cell counter plugin. Cells stained green were counted as live, and cells stained red were counted as dead. Live and dead cell counts for all photomicrographs were totaled to calculate percent viability for each study group compared to glass slide controls. See FIGS. 13-15.

In light of the foregoing, it should be appreciated that the present invention significantly advances the art by providing PEG/PPF di-block copolymer and PPG/PEG/PPF tri-block copolymers (as well as related methods of making and use) that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A block copolymer of poly(ethylene glycol) (PEG) and poly (propylene fumarate) (PPF) comprising from about 5% to about 95% PEG by weight, wherein said block copolymer comprises a PPF/PEG/PPF tri-block copolymer having the formula:

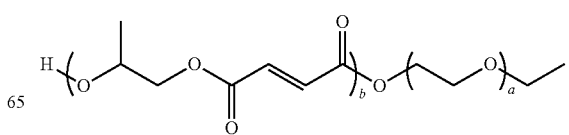

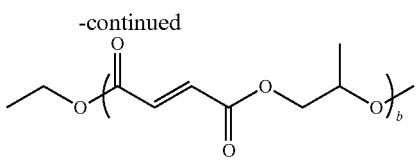

where a is an integer from about 2 to about 100 and each b is an integer from about 2 to about 100.

2. The block copolymer of claim 1 having a number average molecular weight ($M_n$) of from about 500 Da to about 100,000 Da.

3. A method for making the block co polymer of claim 1 comprising:
  A) dissolving a propylene oxide, maleic anhydride, a PEG initiator, and a magnesium catalyst in a suitable solvent;
  B) heating the solution of step A to a temperature of from about 40° C. to about 80° C. for from about 1 hours to about 24 hours to produce a poly(propylene maleate-b-ethylene glycol-b-propylene maleate) intermediate;
  C) dissolving said poly(propylene maleate-b-ethylene glycol-b-propylene maleate) intermediate in a suitable solvent and adding diethylamine; and
  D) heating the solution of step C to reflux for from about 1 to about 24 hours to produce the block co polymer of claim 1.

4. The method of claim 3 wherein the PEG initiator has from about 2 to about 50 ethylene glycol units.

5. The method of claim 3 wherein the PEG initiator is a PEG diol having a number average molecular weight ($M_n$) of from about 100 Da to about 10,000 Da.

6. The method of claim 3 wherein the magnesium catalyst is $Mg(BHT)_2(THF)_2$ derived from 2,6-di-tert-butyl-4-methylphenol (BHT), anhydrous tetrahydrofuran (THF), and di-butyl magnesium.

7. The method of claim 3 wherein the suitable solvent of step A is selected from the group consisting of toluene, hexane, heptane, octane, and combinations thereof.

8. The method of claim 3 wherein the suitable solvent of step A is toluene.

9. The method of claim 3 wherein the suitable solvent of step C is selected from the group consisting of chloroform, dichloromethane, and combinations thereof.

10. The method of claim 3 wherein the degree of polymerization of propylene maleate blocks in said poly(propylene maleate-b-ethylene glycol-b-propylene maleate) intermediate is from about 2 to about 100.

11. A 3-D printed polymeric structure comprising the block copolymer of claim 1.

12. A hydrogel comprising the block copolymer of claim 1.

13. The block copolymer of claim 1, wherein said PEG block comprises the residue of a poly(ethylene glycol) diol having a number average molecular weight ($M_n$) of from 100 Da to 10,000 Da, as measured by MALDI Mass Spectrometry.

14. The block copolymer of claim 1, wherein said PEG block comprises the residue of a poly(ethylene glycol) diol having a number average molecular weight ($M_n$) of from 1000 Da to 4000 Da, as measured by MALDI Mass Spectrometry.

15. The block copolymer of claim 1, wherein said PPF blocks have a degree of polymerization between 6 and 25.

16. The block copolymer of claim 1 having a mass distribution ($Đ_M$) of from about 1.0 to about 2.0.

17. The block copolymer of claim 1, wherein said triblock copolymer is photo crosslinkable.

* * * * *